United States Patent
Tagawa et al.

(10) Patent No.: US 7,227,071 B2
(45) Date of Patent: Jun. 5, 2007

(54) MUSIC SEARCH SYSTEM

(75) Inventors: Junichi Tagawa, Hirakata (JP); Masayuki Misaki, Kobe (JP); Hiroaki Yamane, Kadoma (JP); Masako Ono, Osaka (JP); Ryoichi Yagi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 588 days.

(21) Appl. No.: 10/609,545

(22) Filed: Jul. 1, 2003

(65) Prior Publication Data

US 2004/0003706 A1 Jan. 8, 2004

(30) Foreign Application Priority Data

Jul. 2, 2002 (JP) .............................. 2002-193047

(51) Int. Cl.
*G10H 1/00* (2006.01)
*G01C 21/26* (2006.01)

(52) U.S. Cl. ...................... 84/601; 455/3.06; 701/207; 701/213; 340/989

(58) Field of Classification Search .......... 84/600–609; 455/3.06; 701/200, 207, 213; 340/988, 340/989
See application file for complete search history.

(56) References Cited

U.S. PATENT DOCUMENTS

| 5,944,768 A * | 8/1999 | Ito et al. ..................... 701/200 |
| 2002/0041692 A1 | 4/2002 | Seto et al. |
| 2002/0103598 A1 | 8/2002 | Nakamoto |

FOREIGN PATENT DOCUMENTS

| EP | 1 111 342 | 6/2001 |
| EP | 1 267 315 | 12/2002 |
| JP | 8-063946 | 3/1996 |
| JP | 2001189969 A * | 7/2001 |
| JP | 2001-324335 | 11/2001 |
| WO | 00/45511 | 8/2000 |

OTHER PUBLICATIONS

Matt Welsh et al., "Querying Large Collections of Music for Similarity", UC Berkeley Technical Report, No. -1096, Nov. 1999.

(Continued)

*Primary Examiner*—Jeffrey Donels
*Assistant Examiner*—David S. Warren
(74) *Attorney, Agent, or Firm*—Wenderoth, Lind & Ponack, L.L.P.

(57) ABSTRACT

The present invention provides a music search system for conducting music search, which allows the user to easily listen to music matched to situation. The music search system includes a music data storage section, a location acquisition section, a parameter converting section, a music search section, and a reproducing section. The music data storage section stores a plurality of pieces of music data so as to be associated with a corresponding one of music parameters. The location acquisition section acquires a situation parameter. The parameter converting section converts the situation parameter acquired by the location acquisition section into the music parameter. The music search section uses the music parameter resulted from conversion by the parameter converting section to search through the plurality of pieces of music data stored in the music storage section and selects a piece of music to be reproduced. The reproducing section reproduces the piece of music selected by the music search section.

24 Claims, 21 Drawing Sheets

OTHER PUBLICATIONS

Erling Wold et al., "Content-Based Classification, Search, and Retrieval of Audio", 1996, IEEE Multimedia, IEEE Computer Society, US, pp. 27-36.

Tong Zhang et al., "Hierarchical Classification of Audio Data for Archiving and Retrieving", Mar. 15, 1999, Acoustics, Speech, and Signal Processing, 1999 Proceedings, 1999 IEEE International Conference on Phoenix, AZ, USA Mar. 15-19, 1999, Piscataway, NJ, USA, IEEE, US, pp. 3001-3004.

Eric Scheirer et al., "Construction and Evaluation of a Robust Multifeature Speech/Music Discriminator", Acoustics, Speech, and Signal Processing, 1997, ICASSP-97, 1997 IEEE International Conference on Munich, Germany Apr. 21-24, 1997, Los Alamitos, CA, USA, IEEE Comput. Soc, US, Apr. 21, 1997, pp. 1331-1334.

* cited by examiner

F I G. 4

| No | NORTH LATITUDE | EAST LONGITUDE | IMPRESSION VALUE X | IMPRESSION VALUE Y |
|---|---|---|---|---|
| 00000 | 34° 40' 15.4" | 135° 32' 09.9" | 1.35 | -0.58 |
| 00001 | 34° 40' 15.4" | 135° 32' 11.6" | -0.03 | 1.30 |
| 00002 | 34° 40' 15.4" | 135° 32' 13.1" | -1.59 | 0.18 |
| 00003 | 34° 40' 14.5" | 135° 32' 34.6" | 0.83 | 1.13 |
| 00004 | 34° 40' 08.1" | 135° 32' 38.9" | 2.51 | -2.50 |
| ... | | | | |

FIG. 7

| No | NORTH LATITUDE | EAST LONGITUDE | LOCATION CATEGORY |
|---|---|---|---|
| 00000 | 34° 40' 15.4" | 135° 32' 09.9" | HIGHWAY |
| 00001 | 34° 40' 15.4" | 135° 32' 11.6" | SERVICE AREA |
| 00002 | 34° 40' 15.4" | 135° 32' 13.1" | GENERAL ROAD |
| 00003 | 34° 40' 14.5" | 135° 32' 34.6" | PARK |
| 00004 | 34° 40' 08.1" | 135° 32' 38.9" | SEASHORE |
| ... | | | |

FIG. 8

| LOCATION CATEGORY | IMPRESSION WORD |
|---|---|
| HIGHWAY | LILTING |
| SERVICE AREA | MELTING |
| GENERAL ROAD | RAP-TINGED |
| PARK | RESTFUL |
| SEASHORE | REFRESHING |
| ... | ... |

FIG. 9

| IMPRESSION WORD | IMPRESSION VALUE X | IMPRESSION VALUE Y |
|---|---|---|
| LILTING | 1.35 | -0.58 |
| MELTING | -0.03 | 1.30 |
| RAP-TINGED | -1.59 | 0.18 |
| RESTFUL | 0.83 | 1.13 |
| REFRESHING | 2.51 | -2.50 |
| ... | | |

F I G. 1 0
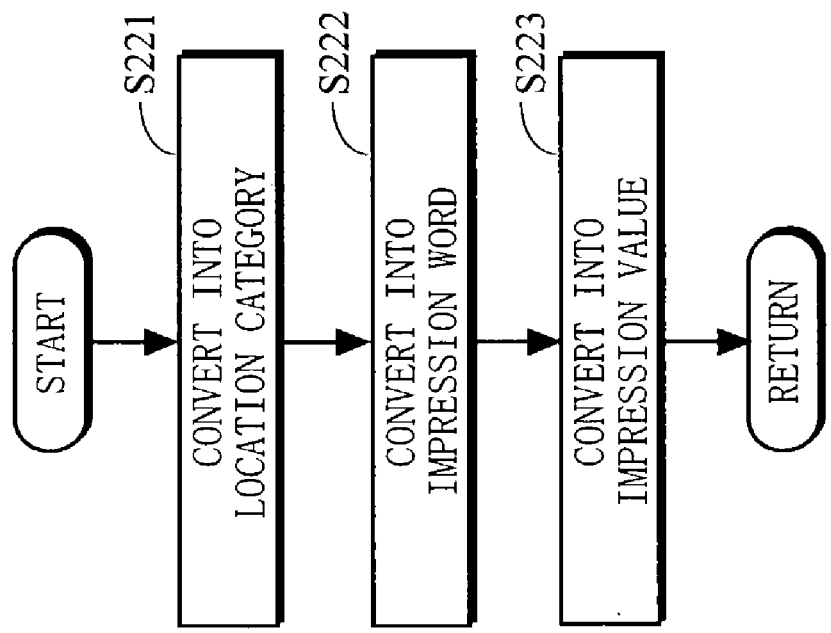

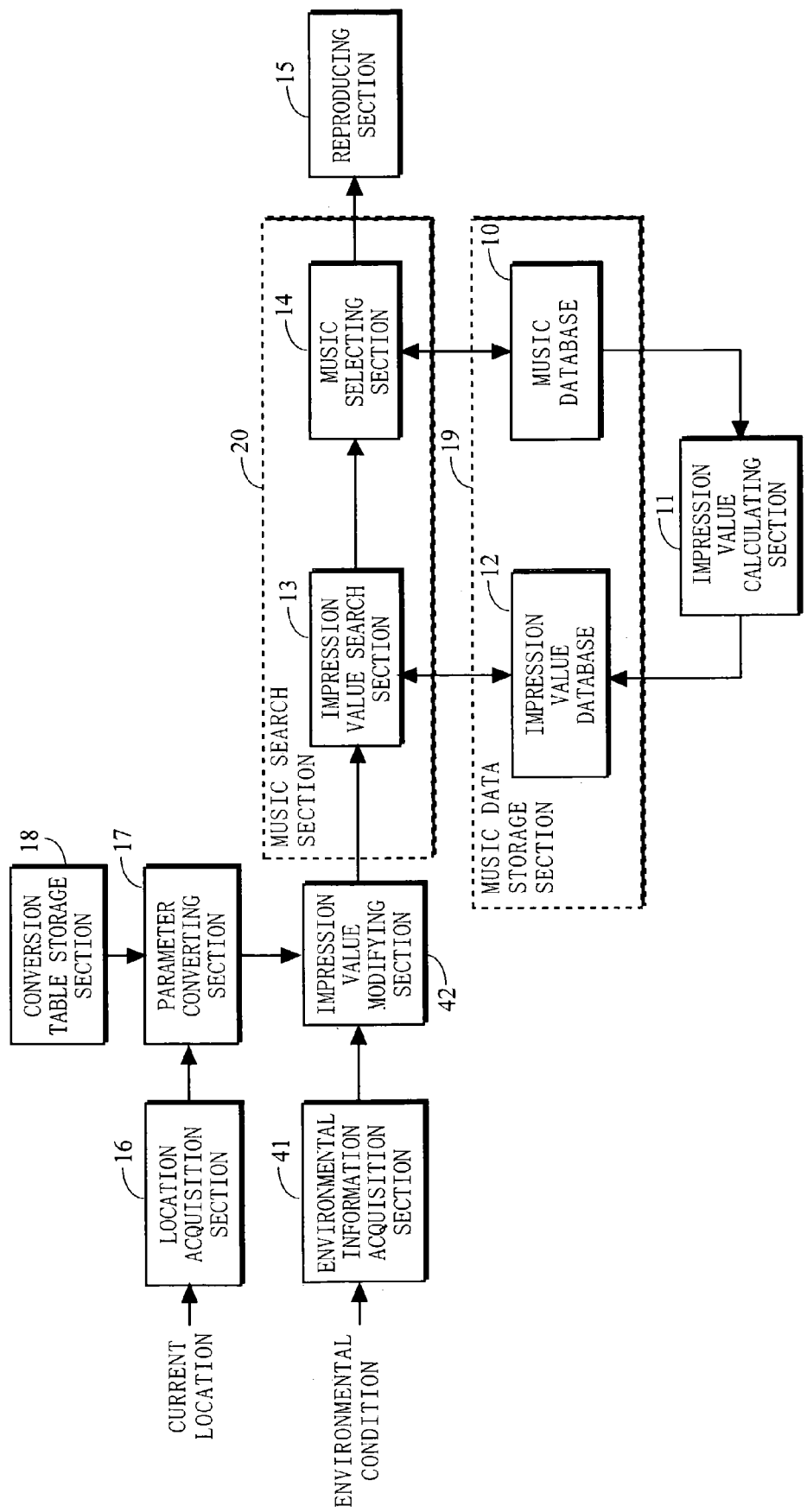
F I G. 1 3

FIG. 20

| No | SPEED | IMPRESSION VALUE X | IMPRESSION VALUE Y |
|---|---|---|---|
| 00000 | 10km/h OR LOWER | * | 0.0 |
| 00001 | 10km/h~40km/h | * | 1.0 |
| 00002 | 40km/h~80km/h | * | 2.0 |
| 00003 | 80km/h OR HIGHER | * | -0.5 |

MUSIC SEARCH SYSTEM

BACKGROUND OF THE INVENTION

1. Field of the Invention

The present invention relates to a music search system and a music search method. More particularly, the present invention relates to a music search system for searching for a piece of music to which the user wishes to listen according to situation.

2. Description of the Background Art

Conventionally, in the field of car audio systems, there have been conceived technologies for automatically reproducing music according to an on-the-spot situation. For example, there is a technology for reproducing/playing music on a predesignated music source (e.g., a CD player, a radio receiver, a cassette tape player, or the like) according to information about a route or the location of a vehicle. In this technology, the user previously associates the route information or the vehicle's location with a music source selected to reproduce music.

FIG. 21 is a diagram illustrating a configuration of a conventional music reproducing apparatus. This conventional music reproducing apparatus includes a location acquisition section 91, a source selecting section 92, a location-source association table 93, a source switching table 94, and a reproducing section 95. The location acquisition section 91 acquires information about a current location of a vehicle. The source selecting section 92 refers to the location-source association table 93 and selects a music source for reproducing music based on the current location information acquired by the location acquisition section 91. In the location-source association table 93, information about locations is associated with music sources to be selected at locations indicated by that location information and in the vicinity of those locations. The source switching section 94 receives respective music signals from the music sources, and outputs to the reproducing section 95 a music signal from one music source selected by the source selector 92. The reproducing section 95 reproduces the music signal output from the source switching section 94.

In the conventional music reproducing apparatus illustrated in FIG. 21, when the vehicle reaches a location associated with a music source, that music source is selected from a plurality of music sources, e.g., a CD player, a radio receiver, a cassette tape player, etc., and reproduces/plays music. Thus, the user can set the conventional music reproducing apparatus so as to automatically reproduce music according to situation. For example, automatic switching among the music sources is performed such that the user can listen to music on CD while driving along a seaside, and can listen to music on the radio while driving through the city. Moreover, by making settings such that each piece of music is associated with the vehicle's location and a music source, it is made possible to reproduce a piece of music matched to a seaview while driving along the seaside, for example.

In the above-described technology, however, the user is required to preset locations and music sources for performing music reproduction at those locations. Accordingly, in order to make settings such that pieces of music are reproduced according to situation, the user is required to previously check those pieces of music to be reproduced. Specifically, in a setting operation, the user is required to determine whether each piece of music is matched to situation. Thus, in the above-described technology, the setting operation is complicated to the user, resulting in a large burden on the user.

SUMMARY OF THE INVENTION

Therefore, an object of the present invention is to provide a music search system allowing the user to easily listen to music matched to situation.

The present invention has the following features to attain the object mentioned above.

An aspect of the present invention is directed to a music search system for conducting a music search, which comprises: a music data storage section; a situation acquisition section; a parameter converting section; a music search section; and a reproducing section. The music data storage section stores a plurality of pieces of music data so as to be associated with a corresponding one of music parameters each representing a feature of a piece of music. The situation acquisition section acquires a situation parameter representing a situation surrounding a user. The parameter converting section converts the situation parameter acquired by the situation acquisition section into the music parameter. The music search section searches through the plurality of music data stored in the music data storage section using the music parameter resulted from the conversion by the parameter converting section, and selects a piece of music to be reproduced. The reproducing section reproduces the piece of music selected by the music search section.

According to this aspect of the present invention, the situation parameter is converted into a music parameter, and music search is conducted using the music parameter. As a result, a piece of music reflecting the situation parameter is selected, whereby it is possible to reproduce a piece of music matched to situation. Further, music search is conducted in accordance with the music parameter, and therefore the user is not required to predesignate a specific piece of music. Thus, the user can enjoy a piece of music matched to situation without making complicated settings.

The music parameter may be an impression value obtained by quantifying an impression left on the user by the piece of music. By using an impression value which can be easily understood by the user, it is made possible to facilitate easy operation of making a change to settings, for example.

Alternatively, the music search system may further comprise a conversion table storage section for storing a conversion table in which the situation parameter is associated with the music parameter. In this case, the parameter converting section converts the situation parameter into the music parameter using the conversion table. Thus, it is possible to easily convert the situation parameter into the music parameter.

Alternatively still, the music search system may further comprise a recording accepting section and an association recording section. The recording accepting section accepts a recording instruction from the user. The association recording section adds to the conversion table a set of a music parameter for a piece of music being reproduced and a current situation parameter when the recording accepting section accepts the recording instruction while the reproducing section is reproducing the piece of music. Thus, it is possible for the user to add an association between a situation and a piece of music to which the user wishes to listen in that situation. Further, such association can be added with respect to the user's current situation, and therefore when the user determines that a piece of music being currently reproduced is matched to the on-the-spot situation, the user can add to the conversion table an association between that piece of music being currently reproduced and the on-the-spot situation. Thus, the user can easily make an addition to the conversion table.

In the case where the music search system is mounted on the mobile unit, the situation parameter may be a movement parameter representing a movement status of a mobile unit moving together with the user. The term "movement parameter" as used herein refers to a concept including a location and a speed of a mobile unit. The movement parameter significantly influences the situation surrounding the user. When the movement parameter is changed, the situation surrounding the user is also changed. Accordingly, the piece of music matched to that situation is also changed. Thus, by using the movement parameter as a situation parameter, it is possible to appropriately search for a piece of music matched to the on-the-spot situation.

Alternatively, the movement parameter may be a set of location coordinates indicating a location of the mobile unit. In this case, the music search system may further comprise a location table storage section, and an impression value table storage section. The location table storage section stores a location table in which the set of location coordinates is associated with a location category representing a feature of the location indicated by the set of location coordinates. The impression value table storage section stores an impression value table in which the location category is associated with an impression value for a piece of music to be reproduced at the location category. The parameter converting section comprises: a location category converting section for converting the set of location coordinates acquired by the situation acquisition section into a corresponding location category using the location table; and an impression value converting section for converting the corresponding location category resulted from conversion by the location category converting section into a corresponding impression value using the impression value table.

According to this aspect of the present invention, the location coordinate, which is a situation parameter, is converted into a location category, and then the resultant location category is converted into an impression value. The location category is expressed by a word, such as "expressway" or "park", which can be easily understood by the user, and therefore the user can make a change to the impression value table very easily. Thus, the user can easily make a change to settings of the music search system through such an easy change of the impression value table.

Alternatively, in the case where the movement parameter is a set of location coordinates indicating a location of the mobile unit, the music search system may further comprise an impression word table storage section, and an impression value table storage section. The impression word table storage section stores an impression word table in which the set of location coordinates is associated with an impression word representing an impression of a piece of music to be reproduced at the location indicated by the set of location coordinates. The impression value table storage section stores an impression value table in which the impression word is associated with the impression value. The parameter converting section comprises: an impression word converting section for converting the set of location coordinates acquired by the situation acquisition section into a corresponding impression word using the impression word table; an impression value converting section for converting the corresponding impression word resulted from conversion by the impression word converting section into a corresponding impression value using the impression value table.

According to this aspect of the present invention, the location coordinate, which is a situation parameter, is converted into an impression word, and then the resultant impression word is converted into an impression value. The impression word is expressed by a word, such as "lilting" or "restful", which can be easily understood by the user, and therefore the user can make a change to the impression word table very easily. Thus, the user can easily make a change to settings of the music search system through such an easy change of the impression word table.

Alternatively still, in the case where the movement parameter is a set of location coordinates indicating a location of the mobile unit, the music search system further comprises a location table storage section, an impression word table storage section, and an impression value table storage section. The location table storage section stores a location table in which the set of location coordinates is associated with a location category representing a feature of the location indicated by the set of location coordinates. The impression word table storage section stores an impression word table in which the location category is associated with an impression word representing an impression of a piece of music to be reproduced at a location indicated by the location category. The impression value table storage section stores an impression value table in which the impression word is associated with the impression value. The parameter converting section comprises a location category converting section, an impression word converting section, and an impression value converting section. The location category converting section converts the set of location coordinates acquired by the situation acquisition section into a corresponding location category using the location table. The impression word converting section converts the location category resulted from conversion by the location category converting section into a corresponding impression word using the impression word table. The impression value converting section converts the impression word resulted from conversion by the impression word converting section into a corresponding impression value using the impression value table.

According to this aspect of the present invention, the location category and the impression word are used for converting the situation parameter into the impression value. Thus, the user can easily make a change to settings of the music search system by making a change to the impression word table and/or the impression value table.

Alternatively still, the music search system may further comprise a route generating section, a point determination section, and a list generating section. The route generating section generates a route between two prescribed points. The point determination section determines a prescribed point on the route. The list generating section generates a list of pieces of music selected by the music search section. In this case, the situation acquisition section acquires the set of location coordinates at the prescribed point as the situation parameter. The reproducing section reproduces the pieces of music in accordance with the list.

According to this aspect of the invention, it is possible to previously search for a piece of music matched to a situation of a certain point on the route. Accordingly, no music search is required during the actual traveling on the route, and therefore an operation burden on the music system during the traveling on the road can be reduced.

Alternatively still, the music search system may further comprise a mobile terminal and a server capable of communicating with the mobile terminal. In this case, the mobile terminal comprises the situation acquisition section and the reproducing section. The server comprises the music data storage section, the parameter converting section, and the music search section. The situation acquisition section transmits the acquired situation parameter to the server. The parameter converting section converts the situation parameter transmitted from the situation acquisition section into the music parameter. The music search section selects a piece of music and transmits data for the selected piece of music to the mobile terminal. The reproducing section receives the data for the selected piece of music transmitted from the music search section, and reproduces the selected piece of music.

According to this aspect of the present invention, the mobile terminal is not required to conduct music search, and therefore it is possible to reduce an operation burden on the mobile terminal. Further, music data is held in a server which is generally capable of holding a large number of pieces of music data, and therefore the number of pieces of music targeted for music search can be significantly increased as compared to a case where music data is held in a mobile terminal. Thus, it is possible to broaden a range of music to be reproduced as a piece of music matched to situation, thereby providing the user with a larger number of pieces of music.

Alternatively still, the music search system may further comprise a mobile terminal and a server capable of communicating with the mobile terminal. In this case, the mobile terminal comprises the music data storage section, the situation acquisition section, and the reproducing section. The server comprises the parameter converting section, the music search section, and a server music data storage section. The server music data storage section stores at least information having the same contents as those stored in the music data storage section. The music data storage section stores music IDs, each identifying a piece of music, so as to be associated with the plurality of pieces of music data. The situation acquisition section transmits the acquired situation parameter to the server. The parameter converting section converts the situation parameter transmitted from the situation acquisition section into the music parameter. The music search section transmits to the mobile terminal a music ID for identifying a selected piece of music. The reproducing section reproduces a piece of music indicated by the music ID transmitted from the music search section.

According to this aspect of the present invention, the mobile terminal is not required to conduct music search, and therefore it is possible to reduce an operation burden on the mobile terminal. Further, it is not necessary to transmit music data from the server to the mobile terminal, and therefore communication traffic volume between the server and the mobile terminal can be reduced.

The music search system according to this aspect of the present invention can be realized by a program, and therefore by recording that program to a recording medium and transferring the recording medium to another stand-alone computer system, the music search system can be easily implemented by that computer system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating an exemplary conversion table;

FIG. 7 is a diagram illustrating an exemplary location table;

FIG. 8 is a diagram illustrating an exemplary impression word table;

FIG. 9 is a diagram illustrating an exemplary impression value table;

FIG. 10 is a flowchart illustrating details of a process for converting location information into impression values in accordance with the second embodiment;

FIG. 13 is a block diagram illustrating a functional configuration of the music search system according to a fourth embodiment;

FIG. 20 is a diagram illustrating a variant example of the conversion table.

DESCRIPTION OF THE PREFERRED EMBODIMENTS

First Embodiment

Figure 1:
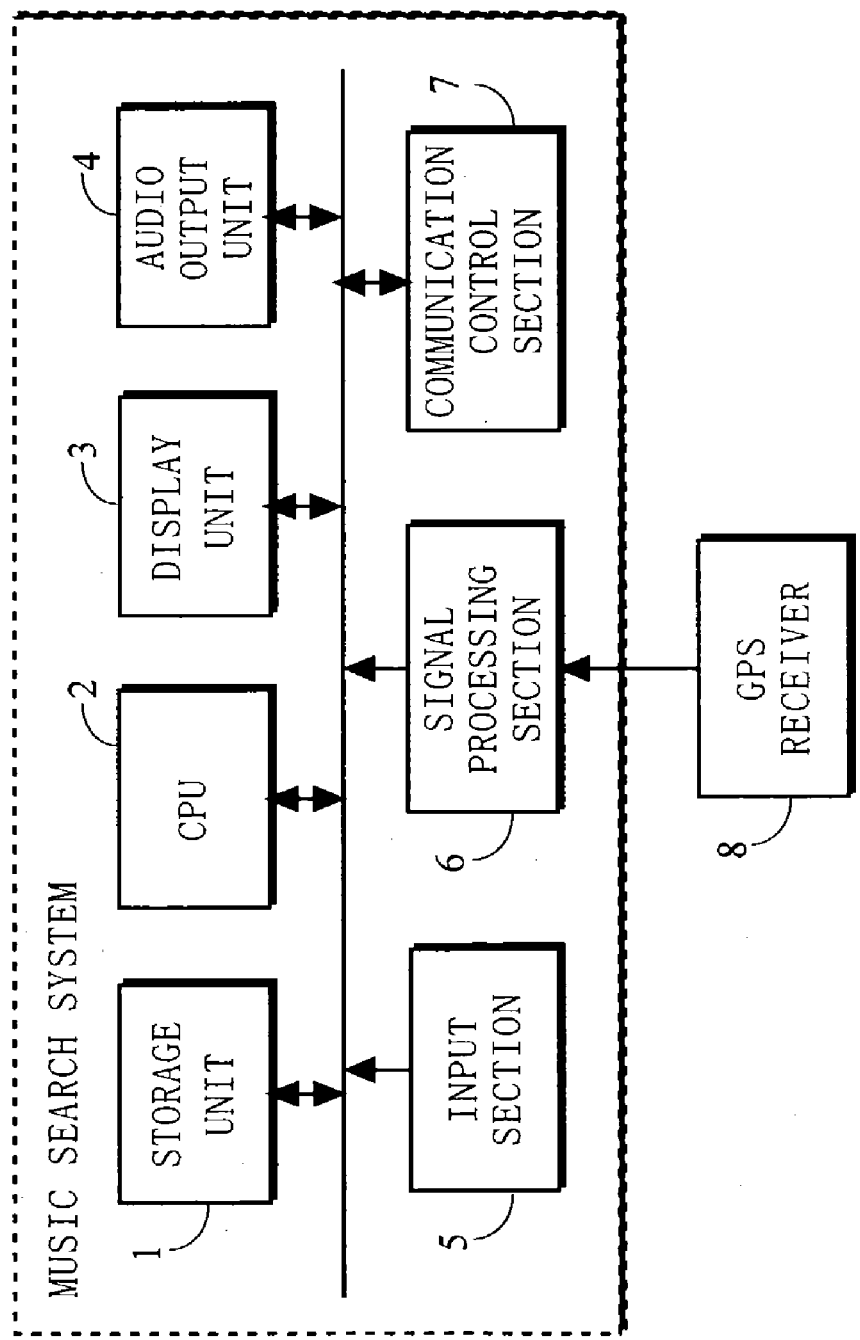
FIG. 1 is a block diagram illustrating a configuration of a music search system according to a first embodiment of the present invention.

FIG. 1 is a block diagram illustrating a configuration of a music search system according to a first embodiment of the present invention. Although the first embodiment will be described with respect to a case where the music search system is implemented as a function of a car navigation system, the music search system may be a specialized apparatus. In FIG. 1, the music search system includes a storage unit 1, a CPU 2, a display unit 3, an audio output unit 4, an input section 5, a signal processing section 6, and a communication control section 7. The signal processing section 6 is connected to a GPS receiver 8.

The storage unit 1 is a hard disk drive, a memory, or the like, and stores various data. Note that the storage unit 1 includes an external recording medium such as a music CD. The CPU 2 performs processes, e.g., a music search process, etc., which will be described later, in accordance with a prescribed program. The display unit 3 is, for example, a liquid crystal display, and displays a map, etc. The audio output unit 4 includes an amplifier, a loudspeaker, etc., and is used for music reproduction as well as audio guidance for route guiding. The input section 5 includes buttons, a remote controller, etc., by which the user can input various instructions. The signal processing section 6 receives a signal from the GPS receiver 8 and outputs information about a current location (hereinafter, referred to as the "current location information") to the CPU 2. The GPS receiver 8 receives GPS waves via an antenna or the like mounted on the vehicle, and outputs a set of latitude and longitude information, which indicates the vehicle's current location, to the signal processing section 6. The communication control section 7 is an interface for establishing communication with the Internet. Typically, the communication control section 7 is connected to the Internet via a communication terminal (not shown) such as a mobile phone. In the first embodiment, the music search system is mounted on the vehicle in the form of a system incorporated in a car navigation system. However, the present invention is not limited to such a form, and the music search system may be implemented as a function of a mobile phone owned by the user, for example.

Figure 2:
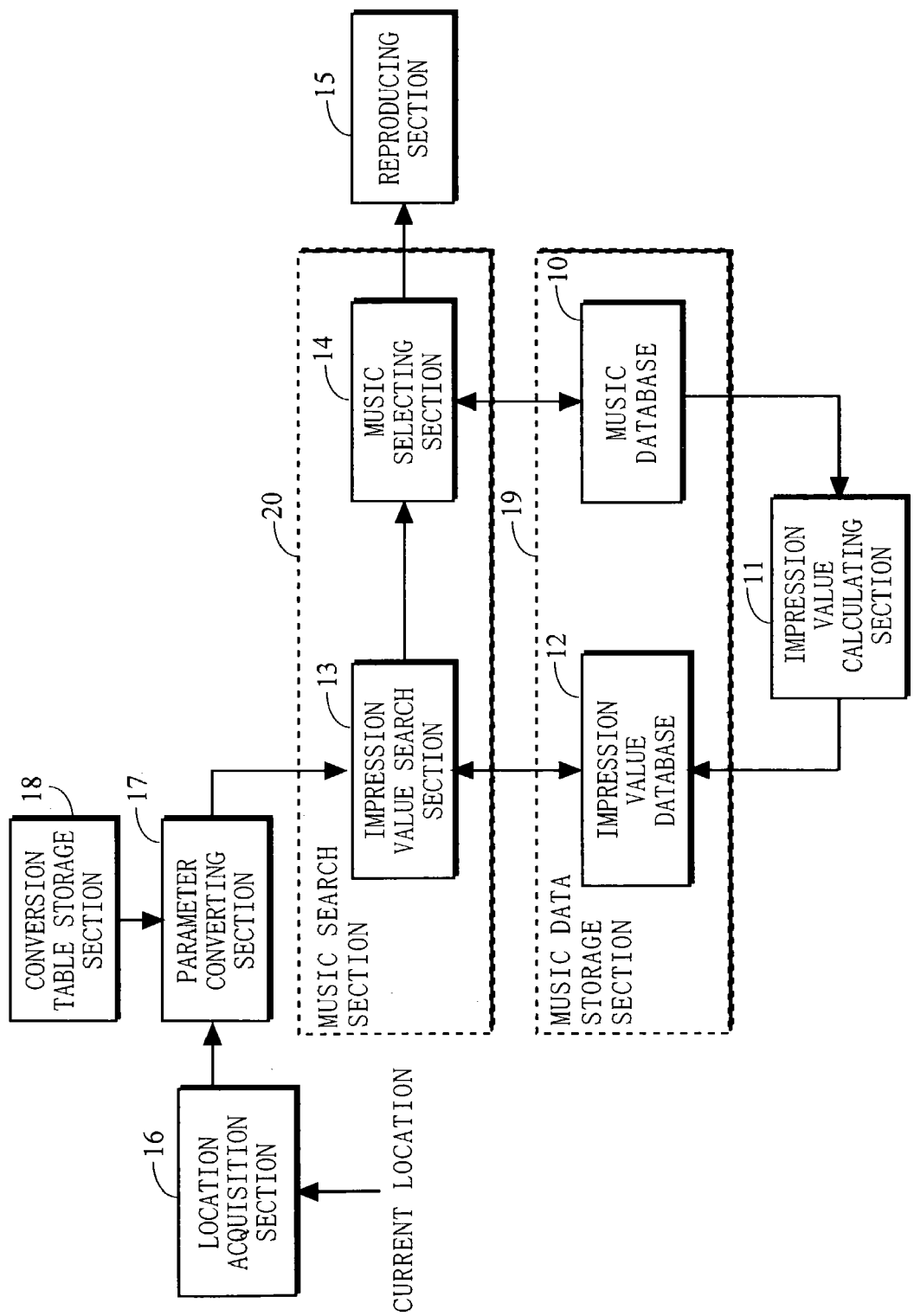
FIG. 2 is a block diagram illustrating a functional configuration of the music search system according to the first embodiment.

FIG. 2 is a block diagram illustrating a functional configuration of the music search system according to the first embodiment. In FIG. 2, the music search system includes a music data storage section 19, a location acquisition section 16, a parameter converting section 17, a conversion table storage section 18, a music search section 20, a reproducing section 15, and an impression value calculating section 11. The music search section 20 includes an impression value search section 13 and a music selecting section 14. The music data storage section 19 includes a music database 10 and an impression value database 12. The music database 10, the impression value database 12, and the conversion table storage section 18 are included in the storage unit 1. The location acquisition section 16, the parameter converting section 17, the music search section 20, and the impression value calculating section 11 are included in the CPU 2 which performs a prescribed programmed operation. The reproducing section 15 is included in the audio output section 4.

A general outline of the configuration illustrated in FIG. 2 will now be described. The music data storage section 19 stores data for a plurality of pieces of music and a plurality of music parameters associated therewith. The term "music parameter" as used herein refers to a parameter representing a feature of a piece of music, and includes concepts of an impression value and a feature value which will be described later. The location acquisition section 16 acquires current location information of the vehicle from the GPS receiver 8. Any system can be used as the music search system as long as that system can acquire information representing a situation surrounding the user even if that system cannot acquire the current location information. Note that a parameter representing a situation surrounding the user is referred to as the "situation parameter". Conceivable examples of the situation parameter include a speed of the vehicle, an ambient noise, an ambient temperature, a pulse of the user, ambient brightness, an altitude of the current location, etc. The parameter converting section 17 converts the current location information acquired by the location acquisition section 16, into a music parameter. Based on the music parameter resulted from conversion by the parameter converting section 17, the music search section 20 searches through pieces of music stored in the music data storage section 19 and selects a piece of music to be reproduced. The reproducing section 15 reproduces the piece of music selected by the music search section 20. Details of elements illustrated in FIG. 2 will be described below.

The music database 10 is included in the storage unit 1 and stores music signal data for a plurality of pieces of music. Music signal data for a desired piece of music is called up based on a music ID for identifying music (e.g., a music title, a music number, etc.). Each music signal is stored in the form of, for example, wave data in the linear PCM format, AAC compressed data, or the like.

The impression value calculating section 11 calculates a set of impression values (hereinafter, also-interchangeably referred to as the "impression value point") for each piece of music stored in the music database 10. Specifically, the impression value calculating section 11 analyzes physical feature values of a music signal received from the music database 10, and calculates a set of impression values by assigning a weight to those physical feature values. Examples of the physical feature values include spectrum variation (a degree of spectrum variation between frames in a prescribed time length), an average number of produced sounds (frequency of producing sounds in a piece of music), nonperiodicity of sounds (a degree of nonperiodicity of sounds reproduced in a piece of music), a beat cycle (a time length corresponding to a quarter note in a piece of music), a beat cycle ratio (a cycle ratio of a sound corresponding to a quarter note in a piece of music to a dominantly produced sound), a first beat intensity (intensity of sounds produced in a cycle corresponding to almost half a beat cycle), a second beat intensity (intensity of sounds produced in a cycle corresponding to almost a quarter of a beat cycle), a beat intensity ratio (a ratio of the first beat intensity to the second beat intensity), etc. The impression value calculating section 11 assigns a prescribed weight to the feature values to calculate one or more impression values per piece of music (in general, two to five impression values are obtained by calculation). In the case of using two impression values, a piece of music can be represented as a point in a two-dimensional space. In the case of using five impression values, a piece of music is represented as a point in a five-dimensional space. Specifically, the pieces of music stored in the music database 10 have their respective sets of coordinate values (hereinafter, also interchangeably referred to as the "coordinate point"). Each coordinate point corresponds to a set of impression values in, for example, the two-dimensional space. Accordingly, each piece of music stored in the music database 10 can be distinguished and determined based on a set of impression values.

The term "impression value" as used herein refers to an index value representing a feeling or emotion about music which is sensed by the user listening to that music. For example, the index value represents the music as hard, energetic, refreshing, plain, soft, or the like. A set of impression values can represent a linear or nonlinear function of a plurality of types of feature values as described above. A piece of music can be represented as a point in a five-dimensional space by using five types of impression values, "hard", "energetic", "refreshing", "plain", and "soft". These five types of impression values are classified into two groups of impression values, i.e., an active factor and an emotion factor. Two impression values "hard" and "energetic" are integrated as the active factor, and three impression values "refreshing", "plain", and "soft" are integrated as the emotion factor. In this case, a piece of music can be represented as a point in a two-dimensional space. Hereinafter, a spatial coordinate system, in which a set of impression values indicates the location of a piece of music, is referred to as the "impression space". Each impression value is a volume representing an impression after listening to a piece of music, and therefore, in the case of arranging a plurality of impression value points in the impression space, the plurality of impression value points are arranged in accordance with similarities in impression about pieces of music. That is, those pieces of music, which leave similar impressions on the user, are arranged in the impression space so as to be close to each other. Note that two types of impression values X and Y are used in the following description.

Figure 3:
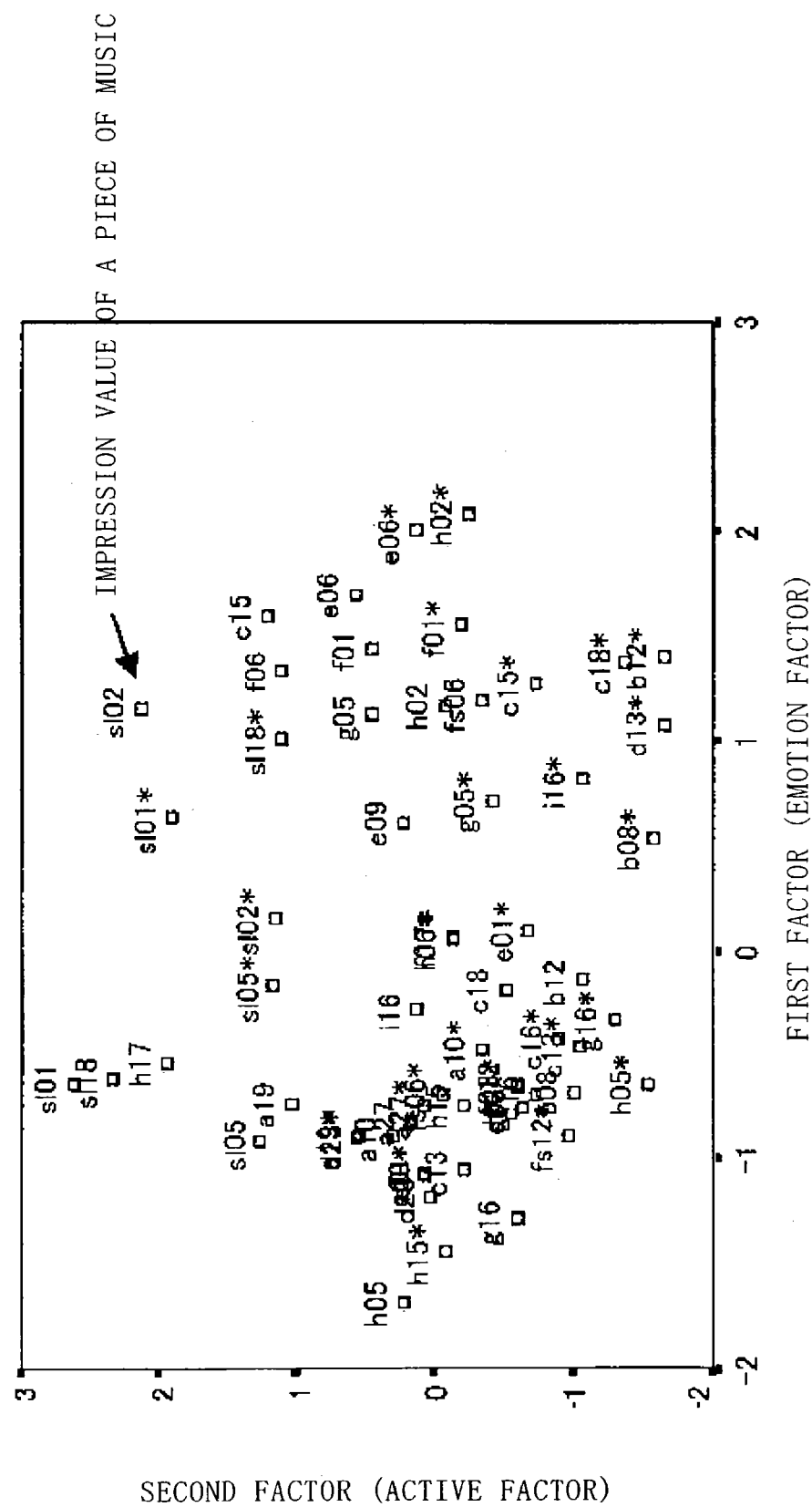
FIG. 3 is a diagram illustrating an exemplary impression space.

FIG. 3 is a diagram illustrating an exemplary impression space. The exemplary impression space illustrated in FIG. 3 is a two-dimensional impression space where the impression values are classified into active and emotion factors. In the present embodiment, an impression value search method is used for registering data for the feature values and the impression values as described above and conducting a music search. The impression values calculated in above-described manner are stored in the impression value database 12 (FIG. 2).

The impression value database 12 stores sets of impression values calculated by the impression value calculating section 11 such that each set of impression values is associated with a music ID of a corresponding one of pieces of music stored in the music database 10. In the first embodiment, the music data storage section 19 includes two databases, i.e., the music database 10 and the impression value database 12. However, the music data storage section 19 does not necessarily include those two databases if data for a plurality of pieces of music data is stored so as to be associated with impression values.

Based on a set of impression values, the music search section 20 searches through the pieces of music stored in the music database 10 and selects a piece of music to be reproduced. In the first embodiment, the music search section 20 includes the impression value search section 13 and the music selecting section 14.

The impression value search section 13 receives a set of search central coordinate values (hereinafter, also interchangeably referred to as the "search central coordinate point") from the parameter converting section 17 which will be described in detail later. The search central coordinate point indicates the location of a piece of music in the impression space. Note that a piece of music is not always present at the location indicated by the search central coordinate point. The impression value search section 13 refers to a combination of a music ID and a set of impression values stored in the impression value database 12 and generates the impression space. Considering the location indicated by a search central coordinate point as a center, a piece of music located in the vicinity of that center is selected. Specifically, an Euclidean distance between the central coordinate point and an impression value point for each piece of music is calculated, and one or more pieces of music are sequentially selected such that a piece of music having the smallest Euclidean distance is prioritized over other pieces of music. A music ID for a selected piece of music is output to the music selecting section 14. The selected piece of music having a small Euclidean distance also has a set of impression values similar to a set of impression values at the search central coordinate point. In other words, each impression value for the selected piece of music represents an active factor or an emotion factor, i.e., an impression, "hard", "energetic", "refreshing", "plain", or "soft", which is similar to that for a piece of music indicated by the search central coordinate point.

In the case where the music selecting section 14 receives a plurality of music IDs from the impression value search section 13, the music selecting section 14 selects one music ID therefrom. Such selection is performed in accordance with a prescribed standard. Any standard may be set as the prescribed standard. For example, a music ID for a piece of music, which has never been reproduced, may be selected, or a music ID for pieces of music of the user's favorite artist (previously registered) may be selected. The music selecting section 14 acquires a music signal for a piece of music indicated by the selected music ID, from the music database 10, and supplies the acquired music signal to the reproducing section 15. Note that, in the case where the music selecting section 14 receives only one music ID from the impression value search section 13, the music selecting section 14 acquires a music signal for a piece of music indicated by that music ID, and then supplies the acquired music signal to the reproducing section 15.

The reproducing section 15 is included in the above-described audio output unit 4, and reproduces a music signal received from the music selecting section 14. In the first embodiment, the reproducing section 15 includes an amplifier and a loudspeaker. However, any element(s) can be included in the reproducing section 15 so long as the element(s) is/are operable to reproduce music signal data stored in the music database 10. For example, in the case where music signal data in a linear PCM format is stored in the music database 10, the reproducing section 15 may include a DA converter. Alternatively, in the case where compressed audio encoded information is stored in the music database 10, the reproducing section 15 may include a decompressor for performing uncompression.

The location acquisition section 16 acquires current location information of the vehicle from the GSP receiver 8. The acquired current location information is output to the parameter converting section 17 as a set of latitude and longitude information.

The parameter converting section 17 refers to a conversion table stored in the conversion table storage section 18 and converts the set of latitude and longitude information received from the location acquisition section 16, into the above-described search central coordinate values. In the conversion table, sets of latitude and longitude information are associated with coordinate values in the impression space.

FIG. 4 is a diagram illustrating an exemplary conversion table. In the conversion table as illustrated in FIG. 4, a point on a map (a set of latitude and longitude information) is associated with a set of impression values (a set of search central coordinate values) for a piece of music matched to that point (situation). That is, the conversion table indicates sets of impression values for pieces of music to be reproduced at points on the map on a point-by-point-basis. Note that the conversion table is used in combination with map data owned by a car navigation system so as to serve as a database in which sets of impression values are assigned to all locations or major locations in latitudes and longitudes on the map. In other embodiments, however, the conversion table may store impression values so as to be associated with points within a certain area on the map.

Upon receipt of a set of latitude and longitude information from the location acquisition section 16, the parameter converting section 17 checks whether a point close to that indicated by the received set of latitude and longitude information is registered in the conversion table. In the case where such a point close to the received set of latitude and longitude information is registered in the conversion table, a set of impression values X and Y corresponding to such a point is converted so as to be set as the search central coordinate point. The search central coordinate values obtained by such conversion are input to the impression value search section 13. When the search central coordinate values are input to the impression value search section 13, a search for a piece of music having values approximate (or equivalent) to the search central coordinate values is conducted, and a piece of music selected by that search is reproduced.

In the first embodiment, the parameter converting section 17 refers to the conversion table and converts information about a location into the impression values. However, in other embodiments, a function for converting that location information into the impression values may be used.

Figure 5:
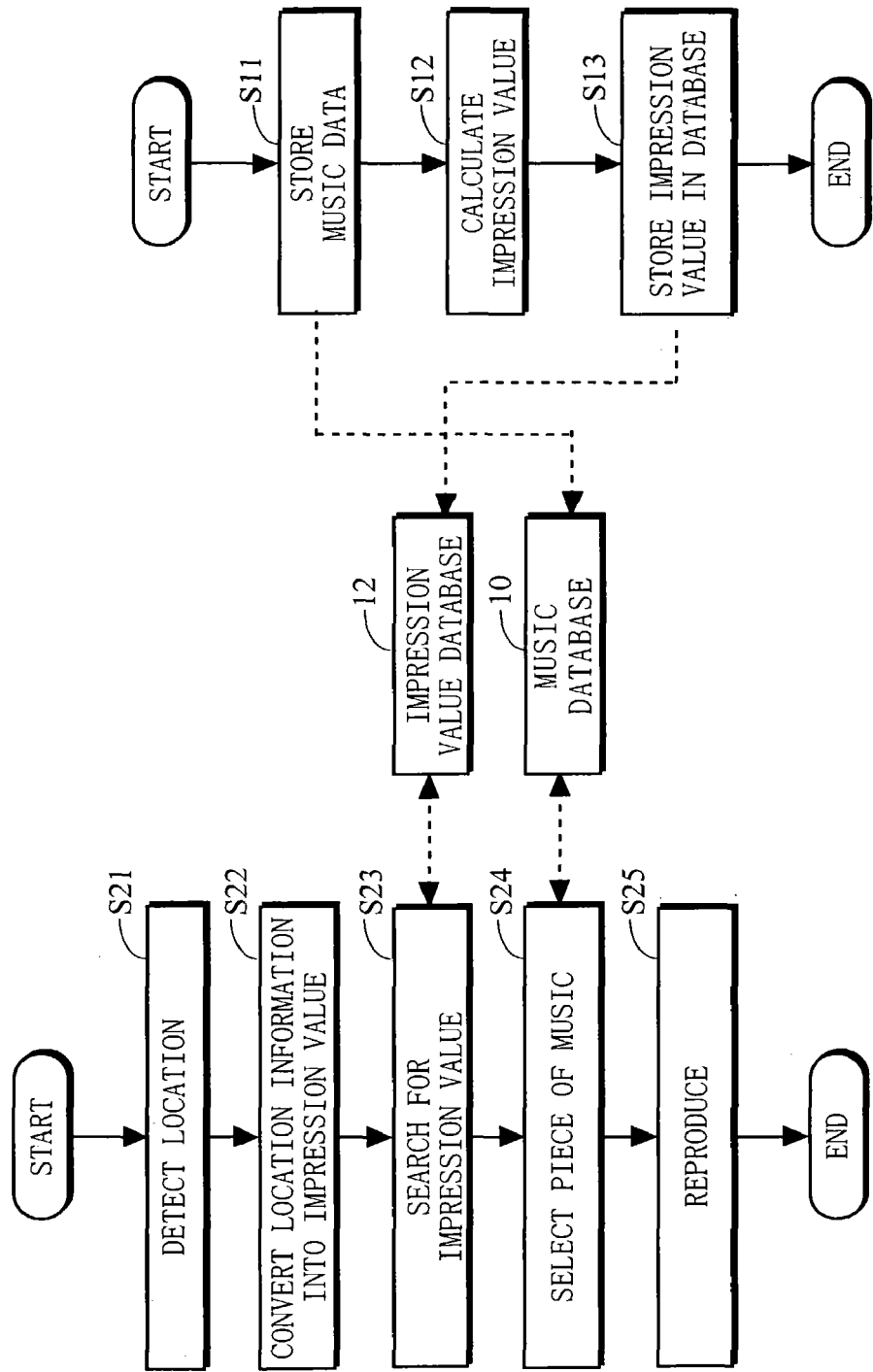
FIG. 5 illustrates flowcharts of the process procedures of a music search system according to the first embodiment.

Hereinbelow, process procedures of the music search system according to the first embodiment will be described. FIG. 5 illustrates flowcharts of the process procedures of the music search system according to the first embodiment. Processing according to the first embodiment is classified into two processes, i.e., a process for generating an impression value database required for conducting music search (steps S11 to S13), and a process for automatically searching for a piece of music matched to a location of the vehicle and reproducing that piece of music (a music search process; steps S21 to S25). These processes are implemented by the CPU 2 performing a prescribed programmed operation.

Firstly, processing at steps S11 to S13 illustrated in FIG. 5 is described. It is preferred that the processing at steps S11 to S13 is previously performed before the vehicle starts traveling. In FIG. 5, music data is stored in the music database 10 (step S11). Then, the impression value calculating section 11 calculates impression values for each piece of music data stored in the music database 10 (step S12). Specifically, a music signal for each piece of the stored music data is analyzed and a feature value for each piece of music is calculated. Then, the impression values are calculated by assigning weights to the calculated feature values. Lastly, the impression value calculating section 11 stores the calculated impression values into the impression value database 12 so as to be associated with a music ID for a corresponding one of pieces of music stored in the music database 10 (step S13). Thus, the music database 10 and the impression value database 12, which are required for conducting music search using the impression values, are generated. Note that, in other embodiments, the music database 10 and the impression value database 12 may be previously generated. Specifically, the music database 10 and the impression value database 12 may be generated by reading a recording medium having these databases stored therein into the music search system.

Next, processing at steps S21 to S25 illustrated in FIG. 5 is described. This processing is performed during the traveling of the vehicle, and may be started by the user's designation (e.g., by pressing a search start button, etc.) or may be regularly performed at prescribed time intervals. Firstly, the location acquisition section 16 receives a signal from the GSP receiver 8 and acquires a set of latitude and longitude information indicating a current location of the vehicle (step S21). The acquired set of latitude and longitude information is passed to the parameter converting section 17.

Then, the parameter converting section 17 refers to the conversion table, and converts the set of latitude and longitude information acquired from the location acquisition section 16, into impression values (step S22). Thereafter, the parameter converting section 17 outputs to the music search section 20 the impression values resulted from conversion as search central coordinate values. When the search central coordinate values are input to the music search section 20, pieces of music stored in the music database 10 are searched through.

The impression value search section 13 selects a piece of music having a set of impression values (a set of active and emotion factors) corresponding to coordinate values approximate to the input search central coordinate values (step S23). At the processing of step S23, the impression value database 12 generated at step S13 is used for reference. Note that the number of pieces of music selected at step S23 may be one or more. For example, only a piece of music corresponding to coordinate values most approximate to the search central coordinate values may be selected or pieces of music within a prescribed distance from the searched central coordinate point may all be selected. A music ID for each of selected piece of music is output to the music selecting section 14.

Then, the music selecting section 14 selects one of input music IDs, and outputs data for a piece of music indicated by the selected music ID to the reproducing section 15 (step S24). The reproducing section 15 reproduces the data for the piece of music input from the music selecting section 14 (step S25). Thus, the music search process is completed. The music search process allows a piece of music having an image matched to the current location of the vehicle to be automatically reproduced.

As described above, according to the first embodiment, the user can enjoy a piece of music having an image matched to an on-the-spot situation without performing complicated operations or making complicated settings. Specifically, when the user presses a search start button, a piece of music indicated by an impression value point approximate to that corresponding to the current location of the vehicle can be selected and reproduced. Moreover, each time the user performs a music selection operation, a piece of music corresponding to an impression matched to the location at which the music selection operation is performed is selected.

Further, by selecting a sequential reproduction mode (in which another music search process is started when a piece of music is completely reproduced), it is made possible to sequentially reproduce pieces of music corresponding to impressions best matched to situation of locations to which the vehicle moves. In the case where the music search process takes undue time, a distance calculation may be started by updating the search central coordinate values slightly before the completion of music reproduction. In such a case, the location of the vehicle at the time of the completion of the music reproduction may be predicted.

Second Embodiment

Hereinbelow, a music search system according to a second embodiment of the present invention will be described. The music search system according to the second embodiment converts current location information (a set of latitude and longitude information) into a set of impression values (a set of search central coordinate values) via a location category and an impression word, rather than directly converting the current location information into the set of impression values. Such conversion in the second embodiment allows the user to readily change settings. Similar to the first embodiment, the music search system according to the second embodiment is provided in the form of a system incorporated in a car navigation system.

Figure 6:
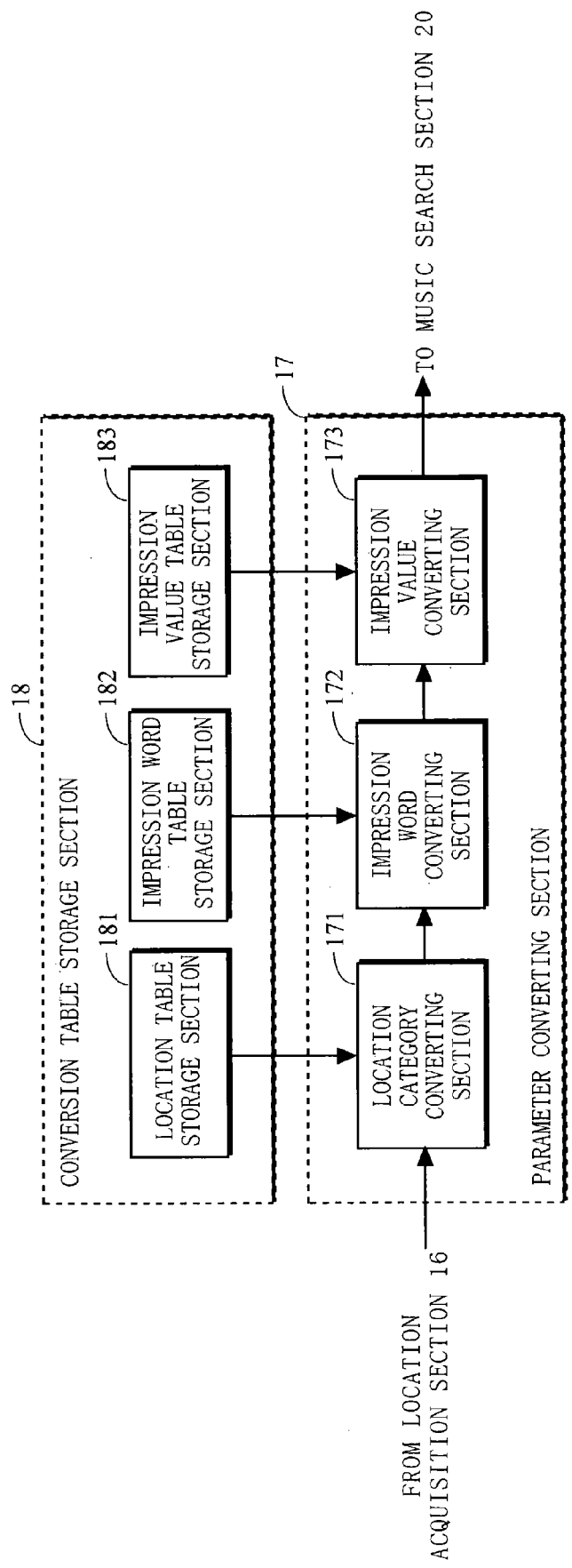
FIG. 6 is a block diagram illustrating a functional configuration of a music search system according to a second embodiment.

FIG. 6 is a block diagram illustrating a functional configuration of the music search system according to the second embodiment. The functional configuration of the music search system according to the second embodiment illustrated in FIG. 6 is similar to that of the music search system according to the first embodiment illustrated in FIG. 2 except that the parameter converting section 17 and the conversion table storage section 18 illustrated in FIG. 6 have internal structures different from those of the parameter converting section 17 and the conversion table storage section 18 illustrated in FIG. 2, and therefore the entire functional configuration of the music search system according to the second embodiment is not illustrated in FIG. 6. In the second embodiment, the parameter converting section 17 includes a location category converting section 171, an impression word converting section 172, and an impression value converting section 173. The conversion table storage section 18 includes a location table storage section 181, an impression word table storage section 182, and an impression value table storage section 183.

In FIG. 6, the location category converting section 171 receives current location information output by the location acquisition section 16, and converts the received current location information into a location category. The term "location category" as used herein refers to a classification word for distinguishing a distinctive place, such as an expressway, a service area, an interchange, a general road, a park, a seashore, an airport, etc. The location category is expressed by a word phrase representing a feature of a location. A location table stored in the location table storage section 181 is referenced when the current location information is converted into the location category. FIG. 7 is a diagram illustrating an exemplary location table. In the location table as illustrated in FIG. 7, sets of latitude and longitude information are associated with location categories. For example, in the case where a set of latitude and longitude information corresponds to "north latitude 34° 40' 15.4" and east longitude 135° 32' 09.9"(or a location within a prescribed range from the location at such latitude and longitude)", the location category is determined to be an "expressway".

The location category output by the location category converting section 171 is input to the impression word converting section 172. The impression word converting section 22 converts the input location category into an impression word. The term "impression word" as used herein refers to a word phrase intuitionally expressing an impression of a piece of music, e.g., "lilting", "melting", "rap-tinged", etc. Note that a word phrase used for an impression value may be directly used as the impression word, or another word may be used as the impression word. An impression word table stored in the impression word table storage section 182 is referenced when the location category is converted into the impression word. FIG. 8 is a diagram illustrating an exemplary impression word table. In the impression word table as illustrated in FIG. 8, location categories are associated with their respective impression words. The impression word table uses word phrases which are very easy to understand (or imagine), and therefore the contents of the impression word table can be changed very easily. For example, when the location category is the "expressway", the impression word is determined to be "lilting".

The impression value converting section 173 (FIG. 6) converts the impression word resulted from conversion by the impression word converting section 172, into an impression value. An impression value table stored in the impression value table storage section 183 is referenced for such conversion. FIG. 9 is a diagram illustrating an exemplary impression value table. In the impression value table, impression words are associated with their respective sets of impression values. For example, when the impression word is "lilting", a set of impression values associated therewith is determined such that (impression value X, impression value Y)=(1.35,−0.58). Note that, in the impression value table, the impression words may be associated with a range of their respective impression values (e.g., 0.3<impression value X<0.6).

As described above, a set of impression values resulted from conversion by the impression value converting section 173 is output as a set of search central coordinate values to the music search section 20. Subsequent operations performed on the set of search central coordinate values are the same as those described in the first embodiment, and therefore description thereof is omitted.

FIG. 10 is a flowchart illustrating details of a process for converting the location information into the impression values in accordance with the second embodiment. The process illustrated in FIG. 10 corresponds to processing at step S22 of FIG. 5. That is, the entire process performed in the second embodiment is similar to the process illustrated in FIG. 5 except that the process illustrated in FIG. 10 is performed instead of performing the processing at step S22 of FIG. 5.

In the second embodiment, following step S21 of FIG. 5, the location category converting section 171 converts the current location information received from the location acquisition section 16, into a location category (step S221). Then, the impression word converting section 172 converts the location category resulted from the conversion at step S221, into an impression word. Thereafter, the impression value converting section 173 converts the impression word resulted from the conversion at step S222, into an impression value (step S223). After the completion of step S223, processing for step S23 and subsequent steps illustrated in FIG. 5 is performed.

Each table stored in the conversion table storage section 18 used in the second embodiment is generated in the following manner. Firstly, location categories and impression words are prepared. Then, pieces of location information (sets of latitude and longitude information) corresponding to the prepared location categories are set, and impression values corresponding to the prepared impression words are set. For example, the location category "expressway" is set such that the expressway extends in latitude and longitude from $(X_1, Y_1)$ through $(X_2, Y_2)$ to $(X_3, Y_3)$. The impression word "danceable" is set so as to correspond to a coordinate point $(ZX_1, ZY_1)$ in the impression space, and the impression word "sleepy" is set so as to correspond to a coordinate point $(ZX_2, ZY_2)$ in the impression space. Lastly, the location categories are associated with the impression words. Such an associating operation may be performed by the user, or the user may suitably change associations between the location categories and the impression words. For example, the location category "expressway" and the impression word "danceable" make a set. It is easy for the user to understand such a set of the location category and the impression word, and the user can readily make a change to such an association. The location categories and the impression words can be associated in a different manner depending on the users. Moreover, even a single user may associate the location categories with the impression words in a different manner depending on his/her mood or the purpose of driving. Thus, it is very advantageous for the user to readily change associations between the location categories and the impression words.

As described above, according to the second embodiment, the user can readily change search settings using the location categories and the impression words. Further, the user can generate a preset impression word conversion table to meet his/her personal preferences.

In the second embodiment, location information is converted into an impression value by using three types of tables, i.e., the location table, the impression word table, and the impression value table. In other embodiments, however, such conversion may be performed in the following manner. Specifically, the location information may be converted into a location category, and then the location category may be converted into an impression value. That is, in the impression value table, location categories may be associated with their respective sets of impression values. In this case, the impression word table, where the location categories are associated with their respective impression words, is not required. Alternatively, the location information may be converted into an impression word, and then the impression word may be converted into an impression value. That is, in the impression word table, pieces of location information may be associated with their respective impression words. In this case, the location table, where pieces of location information are associated with their respective location categories, is not required.

Third Embodiment

Hereinbelow, a music search system according to a third embodiment of the present invention will be described. While reproducing the user's favorite piece of music, the music search system according to the third embodiment allows the user to add that piece of music to the music database 10 so as to enable that piece of music to be searched by an impression value, and also allows the user to additionally establish new association in a location-impression value conversion table. Similar to the first embodiment, the music search system according to the third embodiment is provided in the form of a system incorporated in a car navigation system. Although not included in the music search system according to the first embodiment illustrated in FIG. 1, the music search system according to the third embodiment has a plurality of music sources, such as a CD player, a radio receiver, etc., incorporated therein for music reproduction.

Figure 11:
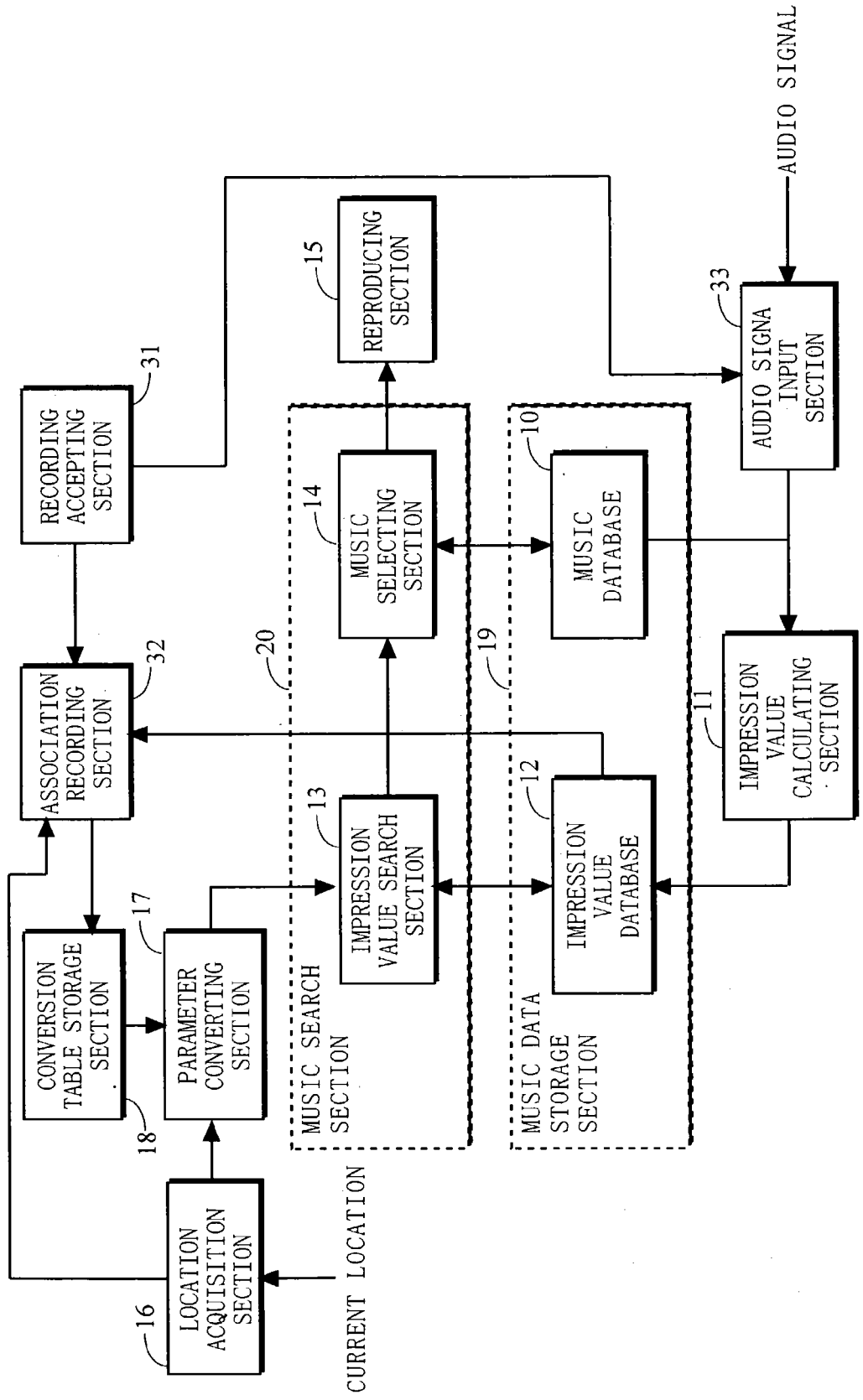
FIG. 11 is a block diagram illustrating a functional configuration of a music search system according to a third embodiment.

FIG. 11 is a block diagram illustrating a functional configuration of the music search system according to the third embodiment. The functional configuration of the music search system according to the third embodiment illustrated in FIG. 11 is similar to that of the music search system according to the first embodiment illustrated in FIG. 1 except that the functional configuration illustrated in FIG. 11 additionally includes a recording accepting section 31, an association recording section 32, and an audio signal input section 33. The following description is mainly focused on differences between the functional configurations illustrated in FIGS. 11 and 2.

The recording accepting section 31 is included in the input section 5, and receives the user's instruction to start recording. It is assumed that when the user feels that a piece of music currently being reproduced is matched to the on-the-spot situation, the user's instruction to start recording is provided. It is also assumed that the input section 5 includes a "favorite button", and the user presses the favorite button to provide an instruction to start recording. The instruction to start recording is supplied to the association recording section 32 and the audio signal input section 33. When the association recording section 32 receives the instruction to start recording from the recording accepting section 31, the association recording section 32 acquires current location information from the location acquisition section 16, and also acquires an impression value from the impression value database 12. Further, the association recording section 32 adds the association between the acquired current location information and the acquired impression value to the conversion table stored in the conversion table storage section 18.

The audio signal input section 33 receives an audio signal output from a music source, such as a CD player, an FM radio receiver, or the like, as the need arises. Upon receipt of the instruction to start recording from the recording accepting section 31, the audio signal input section 33 converts the received audio signal into a music signal which can be analyzed by the impression value calculating section 11, and then outputs the resultant music signal to the impression value calculating section 11. The impression value calculating section 11 calculates an impression value for the music signal output from the audio signal input section 33 in a manner similar to that described in the first embodiment, and stores the calculated impression value into the impression value database 12.

Figure 12:
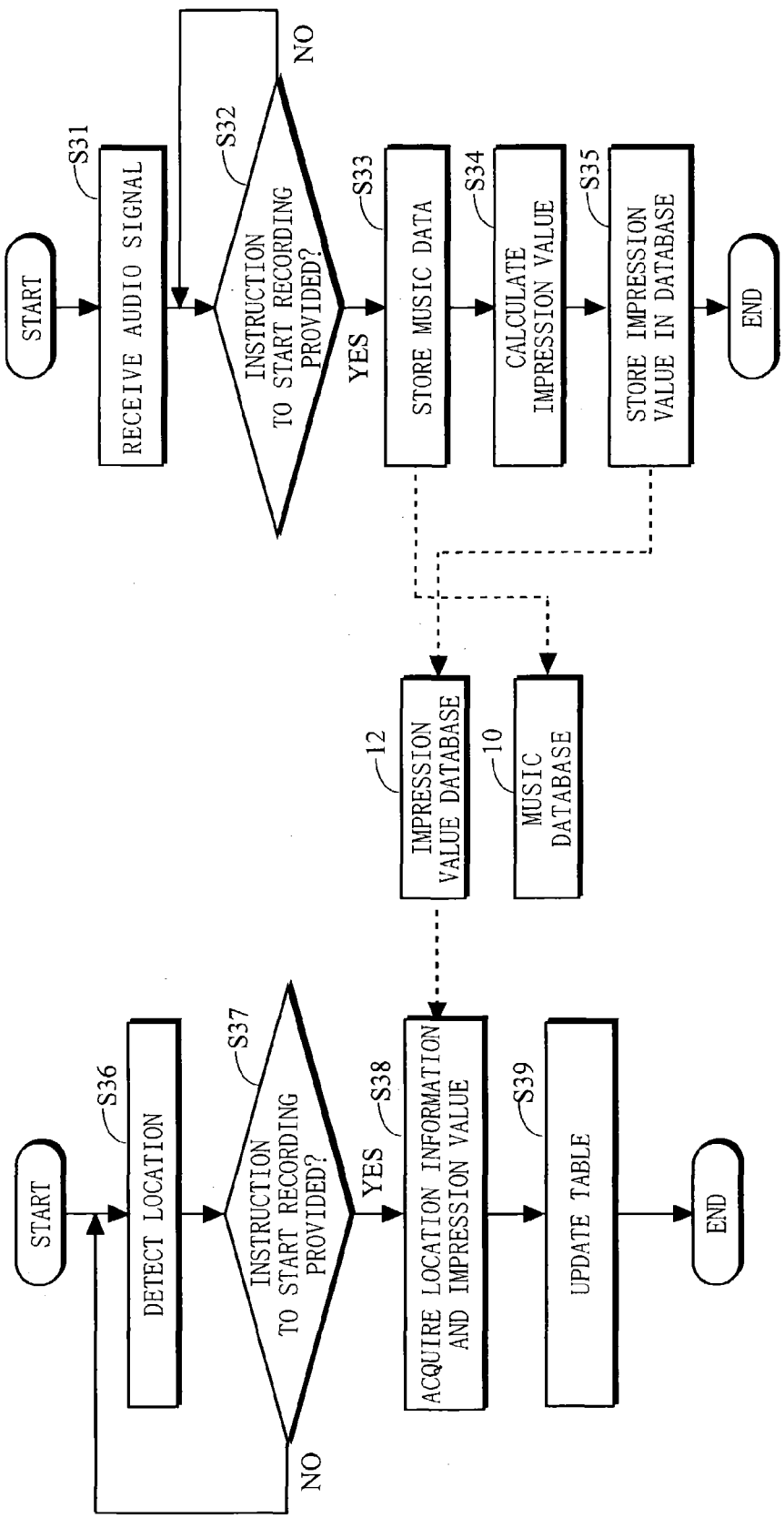
FIG. 12 illustrates flowcharts of the process procedures during music reproduction in accordance with the third embodiment.

Hereinbelow, processing performed during music reproduction will be described. FIG. 12 illustrates flowcharts of the process procedures during music reproduction in accordance with the third embodiment. The processing illustrated in FIG. 12 is classified into two processes, i.e., a process for storing data for a piece of music being reproduced and calculating its impression value (steps S31 to S35), and a process for updating a conversion table (steps S36 to S39). These processes are implemented by the CPU 2 performing a prescribed programmed operation.

When music reproduction is started, the audio signal input section 33 starts receiving an audio signal output by a music source (step S31). Then, the recording accepting section 31 determines whether an instruction to start recording has been provided (step S32). If no instruction to start recording has been provided yet, the recording accepting section 31 stands by for an instruction to start recording. When the recording accepting section 31 receives the instruction to start recording, the audio signal input section 33 stores received music data into the music database 10 (step S33). Then, the impression value calculating section 11 calculates an impression value for a music signal output from the audio signal input section 33 (step S34), and stores the calculated impression value into the impression value database 12 (step S35). After the completion of the above-described process, by the user pressing the favorite button during reproduction of a piece of music, it is possible to record a piece of music and calculate its impression value.

Next, the process for updating the conversion table will be described. When music reproduction is started, the location acquisition section 16 acquires current location information from the GSP receiver 8 (step S36). Then, the recording accepting section 31 determines whether any instruction to start recording has been provided (step S37). If no instruction to start recording has been provided yet, the procedure returns to step S36, and processing at step S36 and S37 is repeatedly performed until the instruction to start recording is provided. On the other hand, if the instruction to start recording has already been provided, the recording accepting section 31 instructs the association recording section 32 to update the conversion table. The association recording section 32 accordingly acquires current location information from the location acquisition section 16, and also acquires an impression value for the piece of music being reproduced from the impression value database 12 (step S38) Lastly, the association recording section 32 updates the conversion table such that the association between the acquired current location information and the acquired impression value is added thereto (step S39).

As described above, according to the third embodiment, in the case where a piece of music matched to the situation of the current location is being reproduced, a new content is added to the conversion table by the user pressing the "favorite button". Accordingly, the next time the user comes to the same location, the user can listen to the same piece of music or another piece of music providing a similar impression without going to any special trouble. Similar to the first embodiment, in the third embodiment, a process for searching and reproducing a piece of music is performed based on an impression value derived from the current location.

In the third embodiment, it is conceivable that the user presses the favorite button at almost the end of the piece of music being reproduced. Accordingly, before the favorite button is pressed, the piece of music being reproduced may be temporarily stored in the music database 10, and calculation of its impression value may be temporarily started. Further, a current location at the time when the favorite button is pressed may be temporarily stored, and then the conversion table may be updated after the completion of the calculation of the impression value. In this case, if the favorite button is not pressed, temporarily stored and calculated data may be deleted the user.

The method according to the third embodiment is also applicable to the case of using location categories and impression words as in the case of the second embodiment. In such a case, a location category and an impression value may be derived from the location at which the "favorite button" is pressed, and the impression value table may be updated such that the association between the derived impression word and the impression value for the piece of music being reproduced is added, for example. The impression word table may be updated as well as the impression value table.

Fourth Embodiment

Hereinbelow, a music search system according to a fourth embodiment of the present invention will be described. The music search system according to the fourth embodiment performs music search in consideration of the current location and other conditions. Similar to the first embodiment, the music search system according to the fourth embodiment is provided in the form of a system incorporated in a car navigation system. Although not included in the music search system according to the first embodiment illustrated in FIG. 1, the music search system according to the fourth embodiment has a sensor (e.g., a temperature sensor or an optical sensor) for detecting an environmental parameter which will be described later. It is assumed that the sensor is connected to the signal processing section 6 illustrated in FIG. 1.

FIG. 13 is a block diagram illustrating a functional configuration of the music search system according to the fourth embodiment. The functional configuration of the music search system according to the forth embodiment illustrated in FIG. 13 is similar to that of the music search system according to the first embodiment illustrated in FIG. 2 except that the functional configuration illustrated in FIG. 13 additionally includes an environmental information acquisition section 41 and an impression value modifying section 42. The following description is mainly focused on differences between the functional configurations illustrated in FIGS. 13 and 2.

The environmental information acquisition section 41 acquires environmental parameters from various sensors incorporated in the car navigation system. The term "environmental parameter" as used herein refers to, for example, an ambient noise, an ambient temperature, a pulse of the user, ambient brightness, an altitude of the current location, etc. The ambient noise is related to city or suburb, and outdoor or indoor. The ambient temperature is related to a season and a weather. The pulse of the user is related to his/her mental state. The ambient brightness is related to day or night, and an indoor situation. The altitude is related to a flatland or a mountain. It can be said that such environmental parameters influence the situation surrounding the user. In the fourth embodiment, a set of impression values (search central coordinate values) used for search, as well as location information, are calculated in consideration of factors influencing the user's mentality. An environmental parameter acquired by the environmental information acquisition section 41 is output to the impression value modifying section 42. In the fourth embodiment, the car navigation system has a temperature sensor incorporated therein, and the environmental information acquisition section 41 acquires a temperature as an environmental parameter.

The impression modifying section 42 modifies search central coordinate values received from the parameter converting section 17. Such conversion is performed based on an environmental parameter received from the environmental information acquisition section 41. Specifically, the modification is performed in accordance with the following method. A modification expression for modifying the search central coordinate values is expressed by a function of values of an environmental parameter and search central coordinates. In a simple example of such a function, the search central coordinate values are shifted to a prescribed direction in accordance with values of the environmental parameter. Specifically, a modification expression such as $$X'=x_1+a(x_2-b),$$

is used, where $x_1$ denotes impression value X which is one of the search central coordinate values, $x_2$ denotes a value of an environmental parameter, X' denotes impression value X after modification, and a and b are constants. The following modification expression, $$X'=x_1[1+a(x_2-b)],$$

may also be used.

Figure 14:
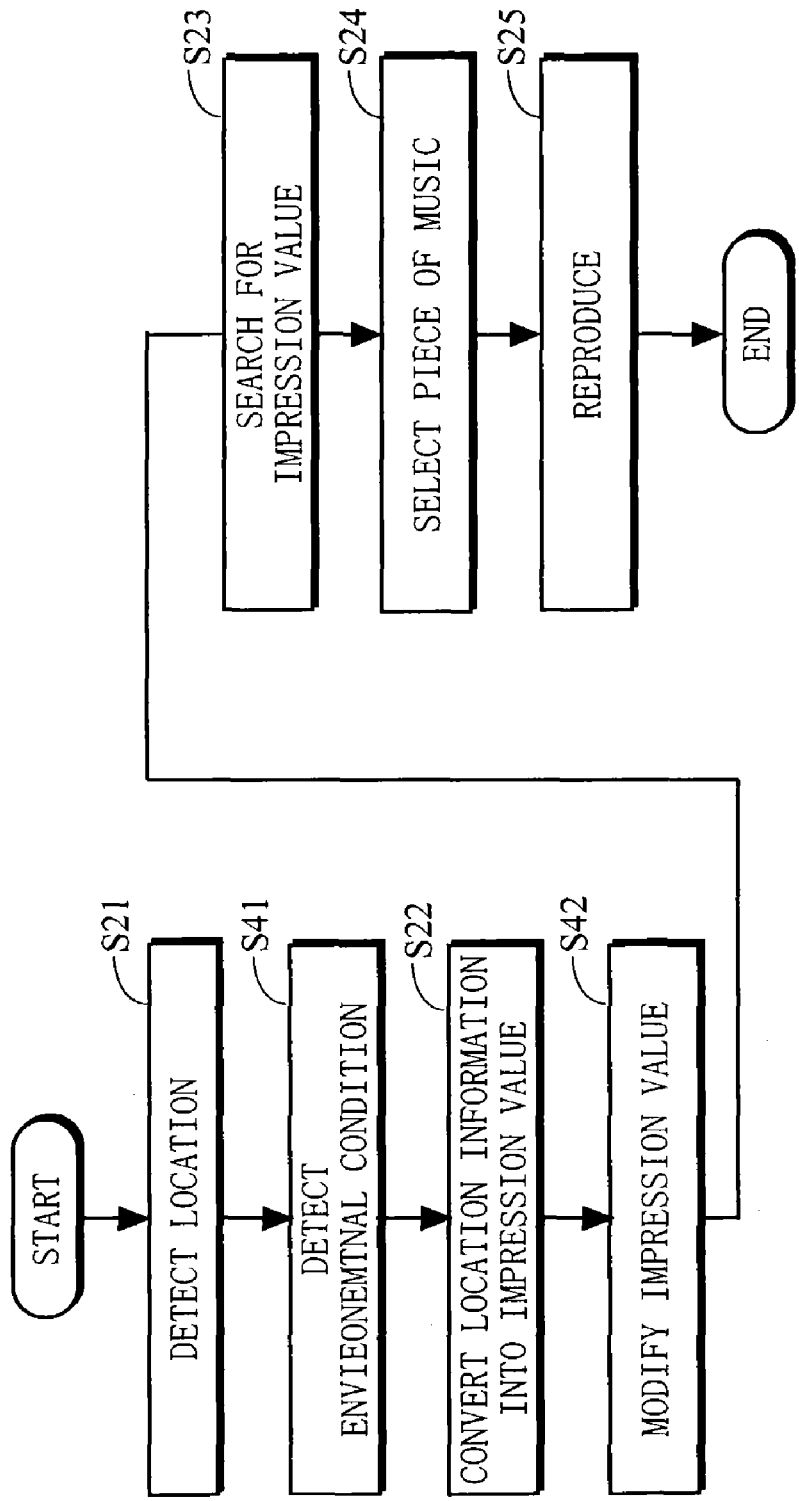
FIG. 14 illustrates a flowchart of the process procedure of a music search system according to the fourth embodiment.

Next, the process procedure of the music search system according to the fourth embodiment will be described. FIG. 14 illustrates a flowcharts of the process procedure of the music search system according to the fourth embodiment. Similar to the first embodiment, two processes, i.e., a process for generating an impression value database (steps S11 to S13 illustrated in FIG. 5) and a music search process, are performed in the fourth embodiment. The process for generating the impression value database is the same as that described in the first embodiment, and therefore is not illustrated in FIG. 14. FIG. 14 only illustrates the procedure of the music search process which is different from that described in the first embodiment. This process is implemented by the CPU 2 performing a prescribed programmed operation. Operations similar to those illustrated in FIG. 5 are denoted by similar step numbers.

Processing at step S21 is the same as that shown in FIG. 5. Following step S21, the environmental information acquisition section 41 acquires an environmental parameter (step S41). Processing at step S22, which is the same as that shown in FIG. 5, is performed. Following step S22, the impression value modifying section 42 modifies impression values resulted from conversion at step S22 based on the environmental parameter acquired at step S41 (step S42). This modification is performed using a function as described above. Processing at step S23 and subsequent steps is the same as that as described in conjunction with FIG. 5.

As described above, according to the fourth embodiment, music search is performed not only by using the location information but also by using the environmental parameter representing the user's surrounding environments. For example, in the case of using a sensor to detect a sound level of ambient noise, the music search can be performed such that search results vary in accordance with levels of ambient noise. Specifically, settings of the music search system can be made such that hard music is selected when the surroundings are noisy or, on the contrary, soft music may be selected. In this manner, by using the environmental parameter, the situation surrounding the user can be detected more finely, so that variations among search results are increased.

Although the fourth embodiment has been described with respect to the case where one type of environmental parameter is used, a plurality of types of environmental parameters may be used. In the case of using the plurality of types of environmental parameters, a modification expression may be prepared for each environmental parameter or a single modification expression including variants for the plurality of types of environmental parameters may be used.

Fifth Embodiment

Hereinbelow, a music search system according to a fifth embodiment of the present invention will be described. The music search system according to the fifth embodiment generates a list (a playlist) of pieces of music to be reproduced based on route information. Similar to the first embodiment, the music search system according to the fifth embodiment is provided in the form of a system incorporated in a car navigation system.

Figure 15:
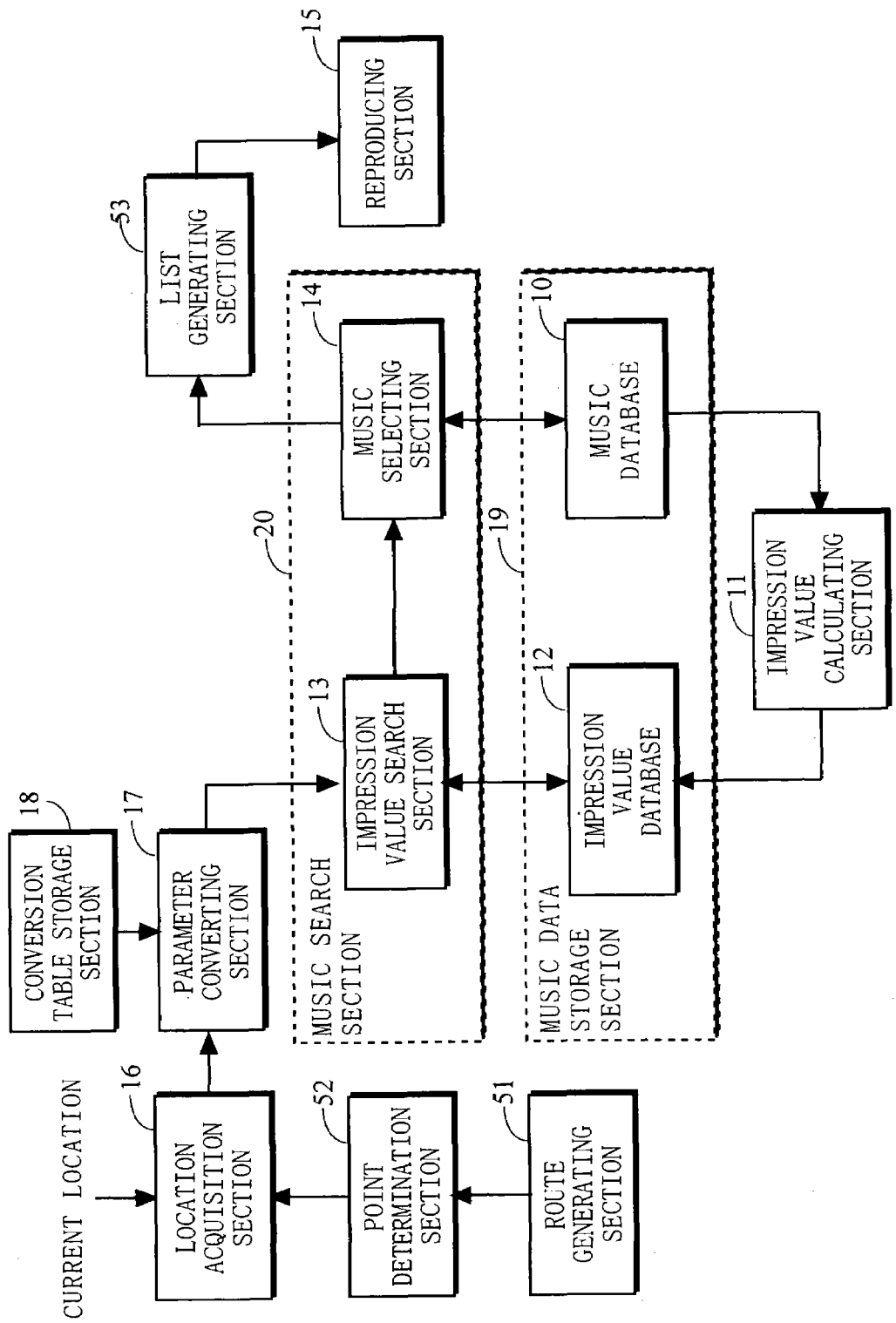
FIG. 15 is a block diagram illustrating a functional configuration of a music search system according to a fifth embodiment.

FIG. 15 is a block diagram illustrating a functional configuration of a music search system according to the fifth embodiment. The functional configuration of the music search system according to the fifth embodiment illustrated in FIG. 15 is similar to that of the music search system according to the first embodiment illustrated in FIG. 2 except that the functional configuration illustrated in FIG. 15 additionally includes a route generating section 51, a point determination section 52, and a list generating section 53. The following description is mainly focused on differences between the functional configurations illustrated in FIGS. 15 and 2.

The route generating section 51 searches for an optimum route (hereinafter, simply referred to as the "route") in a map database or a route database stored in the car navigation system, and calculates traveling time, etc. A device having such a function of the route generating section 51 is well-known in the field of car navigation systems. The route generated by the route generating section 51 is output to the point determination section 52.

The point determination section 52 determines a point (a music start point) at which a piece of music to be reproduced is changed, based on an average music time length and an average vehicle speed. For example, the determination is performed in the following manner. Firstly, a departure point of the route is determined as a first music start point. When the vehicle reaches the first music start point, a first piece of music is started. Then, the average music time length is multiplied by the average vehicle speed to calculate a distance from the first music start point to the next music start point. A second music start point is determined based on the calculated distance and the first music start point. Subsequent music start points on the route are determined one after another based on calculated distances and determined music start points. A set of latitude and longitude information for each determined music start point is output to the location acquisition section 16.

The set of latitude and longitude information acquired by the location acquisition section 16 is converted into an impression value by the parameter converting section 17, and the impression value resulted from such conversion is used for music search. A piece of music selected as the result of the music search will be reproduced at a music start point. The music search section 20 selects a piece of music for each music start point acquired by the location acquisition section 16.

The list generating section 53 generates a list of pieces of music selected by the music search section 20. The list may contain music data received from the music search section 20 or may contain only music IDs. In the list, pieces of information about a music start point at which a piece of music is reproduced are associated with their respective pieces of music. The reproducing section 15 reproduces the pieces of music in accordance with the list. Specifically, each time the current location reaches a specific music start point, a piece of music corresponding to that specific music start point is reproduced.

Figure 16:
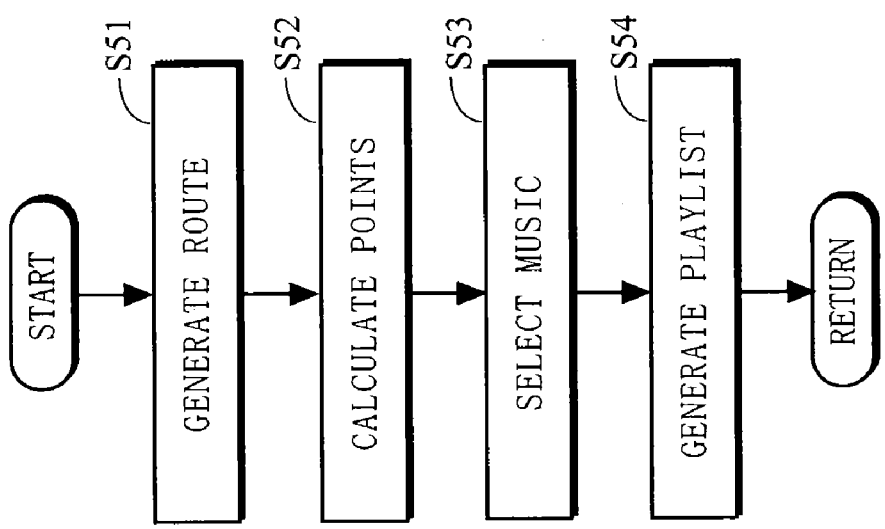
FIG. 16 is a flowchart illustrating the process procedure of a music search system according to the fifth embodiment.

Next, the process procedure of the music search system according to the fifth embodiment will be described. FIG. 16 is a flowchart illustrating the process procedure of the music search system according to the fifth embodiment. The process illustrated in FIG. 16 is performed before the vehicle starts traveling. Firstly, the route generating section 51 generates a route (step S51). A point of departure and a destination on the route are set in accordance with the user's entry, for example. Next, the point determination section 52 determines music start points on the route generated at step S51 (step S52). Then, for each music start point determined at step S52, a piece of music matched to the situation at that music start point is selected (step S53). This process is similar to processing at step S21 to S24 described in the first embodiment. Lastly, the list generating section 53 generates a list of pieces of music selected at step S53 (step S54). In the fifth embodiment, the above-described process is performed before the vehicle starts traveling, and the pieces of music are reproduced in accordance with the list during the traveling of the vehicle.

As described above, according to the fifth embodiment, pieces of music matched to situation of spots can be previously selected before the vehicle actually reach the spots. As such, the present invention is not limited to a music search system for searching a piece of music matched to the current situation, and the music search system of the present invention may search a piece of music matched to an expected situation (in the case of the fifth embodiment, a point expected to be passed by at a later time). According to the fifth embodiment, there is no need to perform a search process during the traveling of the vehicle, and therefore it is possible to reduce an under-travel process burden on the car navigation system.

Further, by transferring data for the generated list to another music reproducing apparatus, it is possible to perform music reproduction according to that list in that music reproducing apparatus. Thus, even a music reproducing apparatus having no music search section can reproduce a piece of music matched to situation.

Furthermore, in the case where a departure time from a departure point is known, it is possible to predict an arrival time at which the vehicle arrives at a music start point. By listing arrival times so as to be associated with pieces of music, it is possible to eliminate a need to detect the current location during traveling. Such a list can be used in a music reproducing apparatus having no function of a GPS receiver.

Sixth Embodiment

Figure 17:
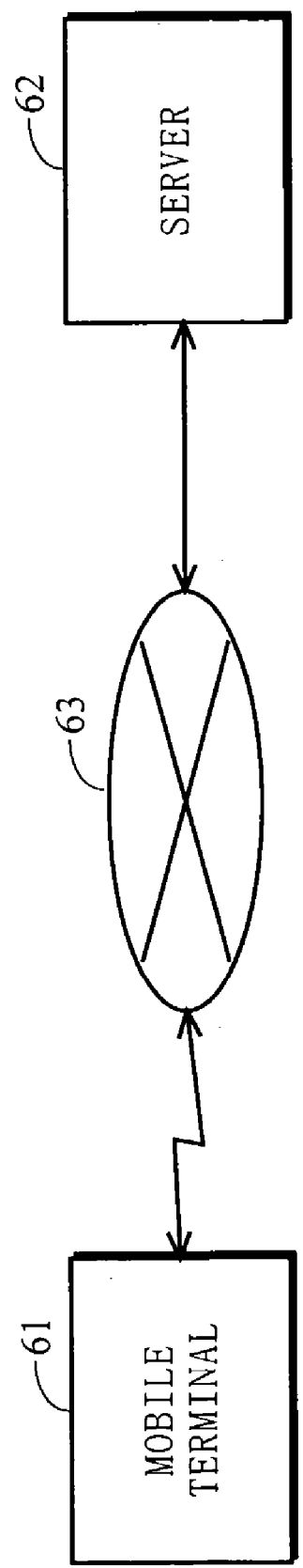
FIG. 17 is a block diagram illustrating a configuration of a music search system according to a sixth embodiment.

Hereinbelow, a music search system according to a sixth embodiment of the present invention will be described. The music search system according to the sixth embodiment includes a mobile terminal and a server. FIG. 17 is a block diagram illustrating a configuration of the music search system according to the sixth embodiment. As illustrated in FIG. 17, the music search system according to the sixth embodiment includes a mobile terminal 61 and a server 62. The mobile terminal 61 and the server 62 can communicate with each other via the internet 63.

Figure 18:
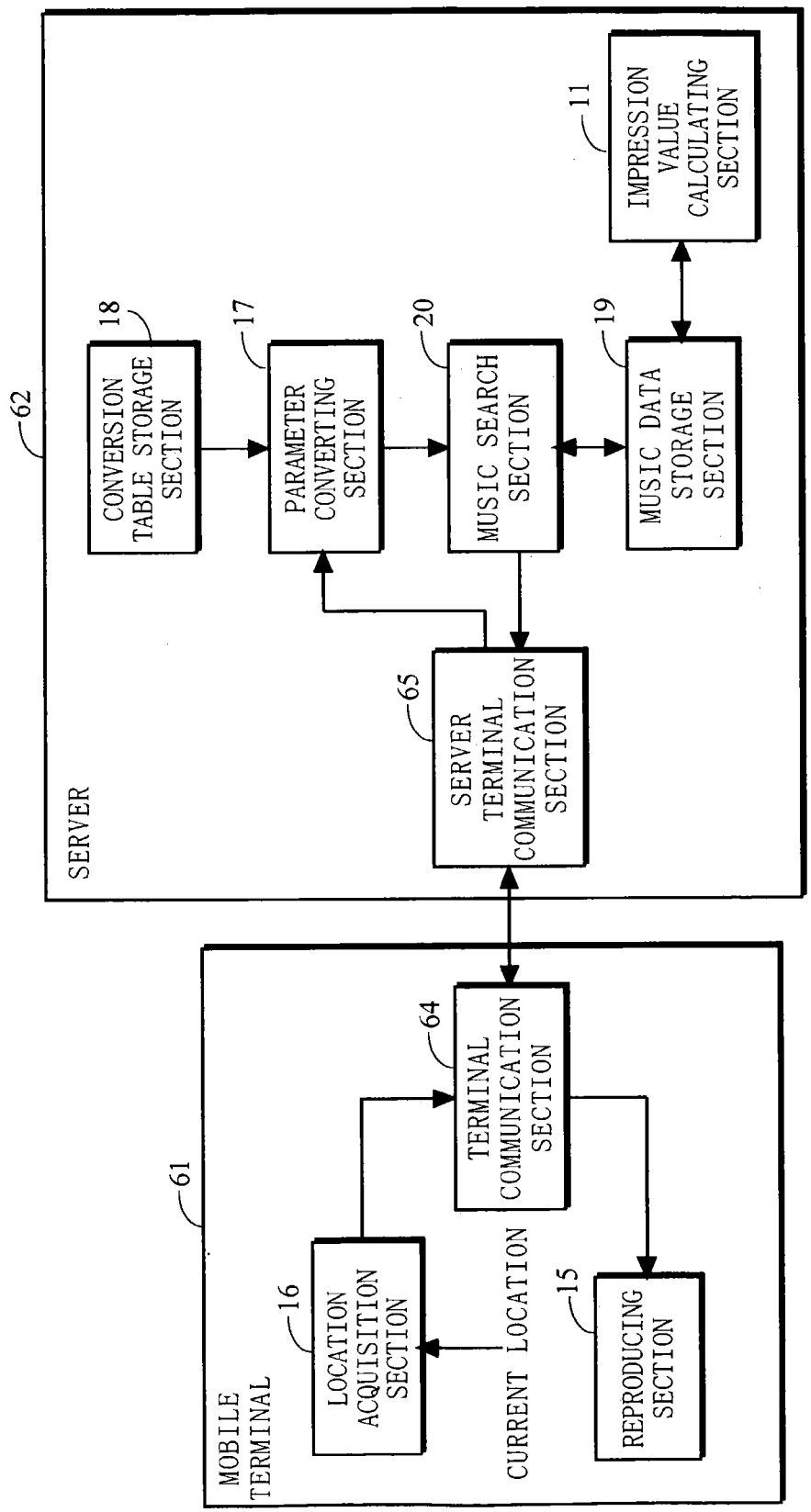
FIG. 18 is a block diagram illustrating a detailed configuration of each of a mobile terminal 61 and a server 62.

FIG. 18 is a block diagram illustrating a detailed configuration of each of the mobile terminal 61 and the server 62. In FIG. 18, elements having functions similar to those of elements illustrated in FIG. 2 are denoted by similar reference numerals. The mobile terminal 61 includes the location acquisition section 16, the reproducing section 15, and a terminal communication section 64. The server 62 includes the music data storage section 19, the parameter conversion section 17, the conversion table storage section 18, the music search section 20, the impression value calculating section 11, and a server communication section 65. The terminal communication section 64 transmits/receives data to/from the server 62 via the internet 63. The server communication section 65 transmits/receives data to/from the mobile terminal 61 via the internet 63. Note that the internet 63 is not illustrated in FIG. 18.

In the sixth embodiment, when the location acquisition section 16 included in the mobile terminal 61 acquires current location information of the mobile terminal 61, the acquired current location information is transmitted to the server 62 by the terminal communication section 64. In the server 62 having received the current location information, a piece of music matched to situation of the location of the mobile terminal 61 is selected by the parameter conversion section 17 and the music search section 20. Music data and a music ID for the selected piece of music are transmitted to the mobile terminal 61 by the server communication section 65. The mobile terminal 61 having received the music data reproduces that piece of music via the reproducing section 15.

As described above, according to the sixth embodiment, the mobile terminal 61 is not required to perform a music search operation, and therefore a process burden on the mobile terminal 61 is reduced. Further, the server 62, rather than the mobile terminal 61, stores music data, and therefore a large number of pieces of music data are targeted for music search. Thus, it is possible to provide the user with a large number of pieces of music, thereby providing the user with pieces of music better matched to situation.

Although the sixth embodiment has been described with respect to the case where the music data and music ID are transmitted from the server 62 to the mobile terminal 61, only the music ID may be transmitted in other embodiments. In such a case, the mobile terminal 61 is required to include a music database. Moreover, contents of the music database included in the mobile terminal 61 are required to be known to the server 62. That is, the server 62 is required to store at least information having the same contents as those stored in the music database of the mobile terminal 61. For example, it is conceivable that the mobile terminal 61 previously transmits the contents of the music database to the server 62.

Figure 19:
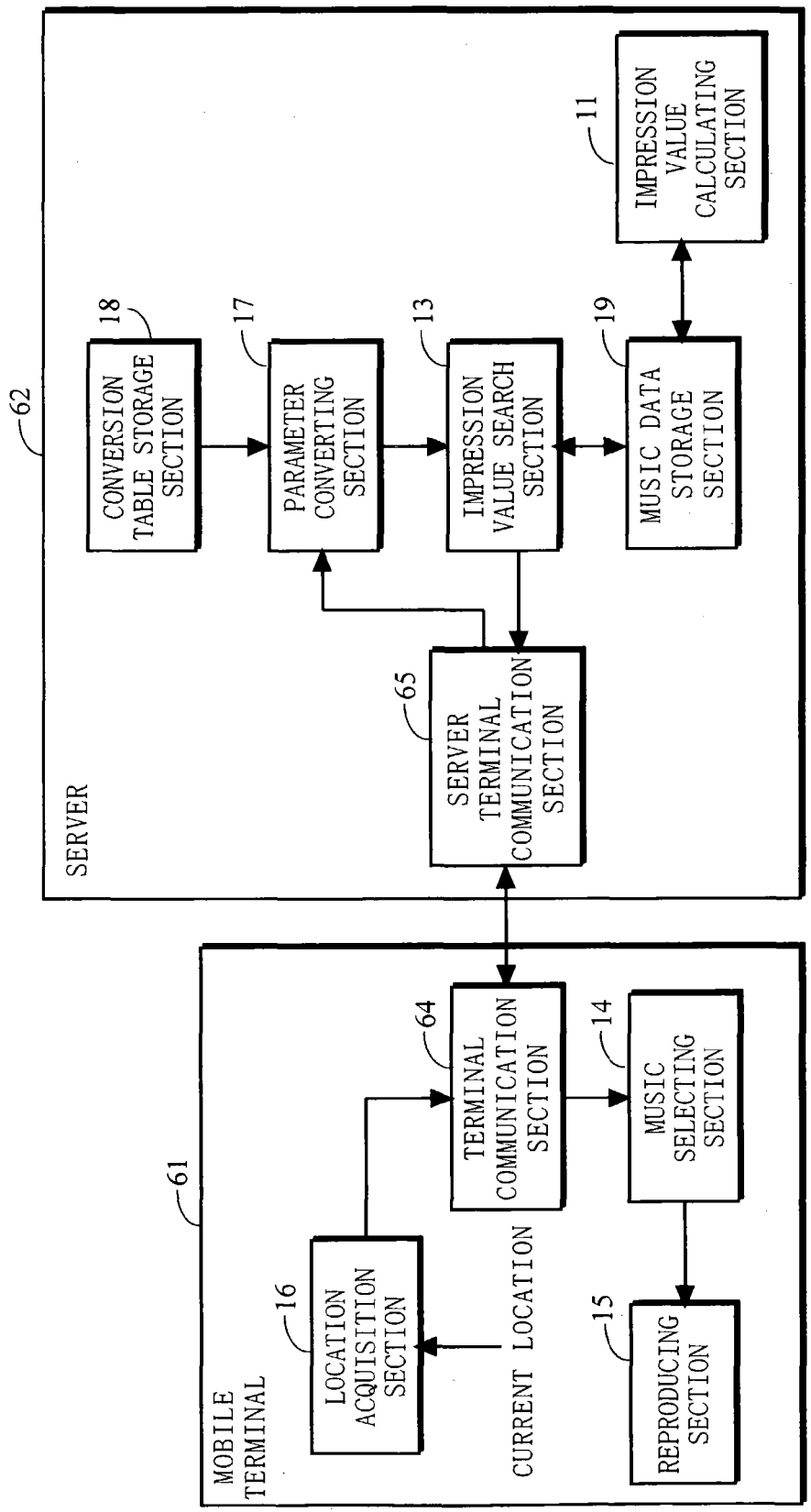
FIG. 19 is a block diagram illustrating another configuration of each of the mobile terminal 61 and the server 62 according to another embodiment of the present invention.
Figure 21:
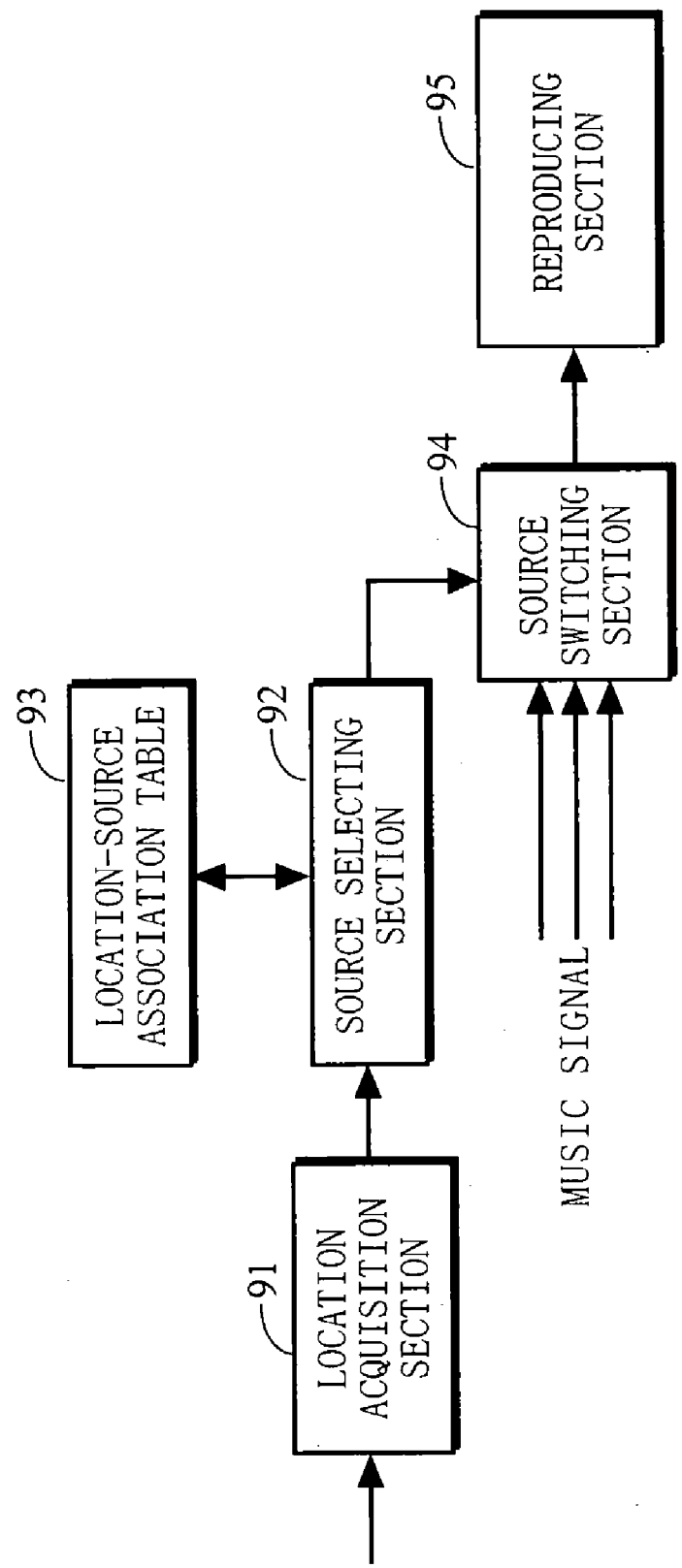
FIG. 21 is a diagram illustrating a configuration of a conventional music reproducing apparatus.

Further, although the sixth embodiment has been described with respect to the case where a piece of music determined by the server 62 is transmitted to the mobile terminal 61, a plurality of candidate pieces of music may be transmitted to the mobile terminal 61 in other embodiments. FIG. 19 is a block diagram illustrating another configuration of each of the mobile terminal 61 and the server 62 according to another embodiment of the present invention. In FIG. 19, a plurality of pieces of music are selected by the impression value search section 13 included in the server 62, and music data and music IDs for these pieces of music are transmitted by the server 62. In the mobile terminal 61, one of the plurality of pieces of music received from the server 62 is selected by the music selecting section 14, and is reproduced.

Furthermore, although the sixth embodiment has been described with respect to the case where the mobile body terminal 61 is configured to have no function of conducting music search, such a function may be provided in other embodiments. Specifically, the mobile terminal 61 may be either one of the car navigation systems according to the first to fifth embodiments. In such a case, both the mobile terminal 61 and the server 62 may conduct music search, and a piece of music may be selected from among search results and reproduced. Alternatively, when a suitable piece of music is not found in the mobile terminal 61, the server 62 may conduct music search.

Note that the number of the conversion table as described above is not limited to one, a plurality of conversion tables may be used separately in accordance with prescribed requirements. For example, three types of conversion tables may be separately used according to time of day. Specifically, these three types of conversion tables may be prepared for morning, daytime, and nighttime, such that pieces of more refreshing music are selected during the morning, and pieces of softer music are selected during the nighttime. As in the case of the conversion table, for each type of tables used in the second embodiment, i.e., the location table, the impression word table, and the impression value table, a plurality of tables may be separately used according to prescribed requirements.

These plurality of types of tables (the conversion table, the location table, the impression word table, and the impression value table) may be additionally externally acquired through distribution to the music search system. The internet or a removable medium can be used for such distribution. Similarly, music data stored in the music database 10 may be additionally externally acquired through distribution to the music search system. For example, such distribution could be one of advantageous ways of supplying newly released pieces of music.

Although each of the first to fifth embodiments has been described with respect to the case where the music search system is provided in the form of a system incorporated in the car navigation system, the form of the music search system of the present invention is not limited to this. The music system of the present invention can be implemented by combining a potable audio device, such as a portable music server or semiconductor player having a large number of pieces of music stored therein, a personal GPS device, and a function of conducting music search using an impression value. By implementing the music search system using a portable mobile terminal, it is made possible to use the music search system during a journey on train, for example.

Further, although each of the first to sixth embodiments has been described with respect to the case where the location information is used as a situation parameter, the situation parameter is not limited to the location information. For example, the vehicle's speed or the like may be used as a situation parameter. FIG. 20 is a diagram illustrating a variant example of the conversion table. In the conversion table illustrated in FIG. 20, there is no association between impression value X and speed. In this case, information about speed is converted only into impression value Y, and music search is conducted using only the impression value Y. In this manner, it is also possible to conduct music search using only one type of impression value. The location information and speed information may be used as situation parameters and converted into impression values X and Y, respectively.

Furthermore, parameters, such as an ambient noise, an ambient temperature, a pulse of the user, ambient brightness, and an altitude at the current location, may be conceivable as situation parameters. There is a known system called a vehicle information communication system (VICS) for providing the vehicle on the road with traffic information such as congestion information. Such congestion information obtained by the VICS may also be used as a congestion information situation parameter. Specifically, a conversion table may be generated such that a piece of more melting music is selected when the music search system receives the congestion information. As to the fourth embodiment, an impression value is modified such that a piece of more melting music is selected when the music search system receives the congestion information.

In the case of successively reproducing pieces of music, the same values may be acquired as situation parameters, and therefore a piece of music previously played may be reproduced again. For example, in the case where the location information is used as a situation parameter, it is conceivable that location information, which is almost same as the previous location information, is acquired since the traffic signal, traffic congestion, or the like, hardly allows the vehicle to move. In order to avoid such a case, history information about all reproduced pieces of music may be recorded in a memory so as not to select pieces of music reproduced during a prescribed time period in the past. Specifically, pieces of music included in the history information are not targeted for music search. In this case, pieces of music, which have been reproduced the prescribed time period ago or more, may be deleted from the history information. Alternatively, history information about pieces of music frequently played may be recorded in the memory, and those pieces of music included in the history information may have higher priority in selection.

Further, although each of the first to sixth embodiments has been described with respect to the case where music search is conducted using only impression values, bibliographic information, such as music titles, artist names, music category names, etc., may be used together with the impression values. For example, in the case where the user previously enters artist names and category names, music search may be conducted through such previously entered information. For example, it is also possible to conduct music search with respect to pieces of music having titles including the word "beach". Alternatively, in the case where the user previously enters the name of a specific artist, music search may be conducted through songs in his/her repertoire, and therefore it is possible to enjoy his/her one-man-concert-like performance.

Furthermore, each of the first to sixth embodiments has been described with respect to the case where a piece of music selected by music search as a piece of music to be reproduced has a set of impression values approximate to a set of search central coordinate values. However, random numbers may be used for randomly selecting a piece of music from among pieces of music, which is located at an impression value point located within a prescribed distance from a search central coordinate point.

Further still, although the example of generating a list from the route has been described in the fifth embodiment, the opposite to this is also possible, such that the user generates a music list first, and then a driving route is derived from the music list. In the case of formulating a driving plan based on such a driving route, the user can select a driving route in accordance with the order of music to be reproduced. Thus, the user can enjoy driving like a game, which may be called "music rally".

Further still, a music system according to each of the first to sixth embodiments can be used as a schedule managing function. In such a case, when time is used as a situation parameter and there is a delay between a scheduled time of arrival and an estimated time of arrival, a piece of music, which makes the user to become aware of the delay, may be reproduced. Specifically, a schedule management data table is prepared for storing scheduled timepoints on the schedule, for example. When it is found that a time leeway is reduced to below a certain level by comparing the current time with a scheduled timepoint on the schedule, a piece of music, which has an impression value, "up-tempo", may be reproduced.

Further still, transportation information, e.g., information about a railroad company of a train boarded by the user, may be detected as a situation parameter. In such a case, pieces of transportation information are converted into location categories, and impressions of railroad companies or areas along train lines are selected as impression words which are converted into impression values. Music search is conducted using the thus-obtained location categories and impression values. For example, in the case where the user boards a train on train line X extending in the neighborhood of lake Y, the transportation information is converted into impression words making the user visualize a lake, a lakeshore, a boat, a yacht, etc.

Further still, in the case where the music search system can communicate with a prescribed device of a different type, location information of the prescribed device may be used as a situation parameter. In this case, the music search system receives the location information and a device ID, and when the current location of the music search system becomes near the location indicated by the received location information to a certain distance, a piece of music having a predetermined impression value is reproduced. Thus, it is possible to cause a certain event to occur when the prescribed device comes near. For example, when an acquaintance of the user who has that predetermined device comes near, a piece of music having an image of the acquaintance is made to be reproduced. A function as described above can be implemented by combining music search and reproduction functions with a personal terminal device or mobile phone having a function devised for tracking a straying senior person or child.

Further still, in a music search system according to each of the first to sixth embodiments, a conversion table may be dynamically distributed. For example, distributed in the vicinity of a fast-food restaurant may be a conversion table which makes it possible to select a piece of music leaving an impression similar to that of the restaurant's theme song. Thus, the restaurant can leave a clear impression on the user, thereby encouraging the user's revisit. Alternatively, a bonus point for special service may be provided to the user when the conversion table is distributed to the user.

Further still, in the case where the music search system has a function of additionally obtaining contents of the conversion table, the location table, the impression word table, and/or the impression value table (see the third embodiment), the music search system is capable of feeding back the additional contents. Specifically, the music search system can transmit additional contents of a table(s) to a collection center. Thus, the collection center can collect information about associations in the table(s) established by the user. By distributing the associations collected by the collection center to a different user, that different user can add the associations to a table(s) for his/her own system. Accordingly, he/she can readily obtain appropriate impression values and appropriate impression words for places to which he/she has never been. Thus, users can share among them a feeling and an emotion experienced by a user having visited a certain place.

Further still, the collection center can easily summarize the users' impressions on a certain place. For example, in the case where the certain place corresponds to a restaurant, it is possible to monitor what kind of impression of music the users think matches to that restaurant provides. By considering the impression of a piece of music as that of the restaurant, it is possible to monitor how the users feel about the atmosphere of the restaurant.

Further still, in the case where the collection center provides tables and pieces of music, the collection center can determine the user's taste based on information collected from the user, whereby it is possible to provide tables and pieces of music matched to the user's taste.

In order to feed back the contents of tables, the music search system may have a configuration similar to that illustrated in FIG. 17. Specifically, a communication line may be established between the collection center and the music search system.

While the invention has been described in detail, the foregoing description is in all aspects illustrative and not restrictive. It is understood that numerous other modifications and variations can be devised without departing from the scope of the invention.

What is claimed is:

1. A music search system for conducting a music search, comprising:
   a music data storing section for storing a plurality of pieces of music data so as to be associated with a corresponding one of music parameters each representing a feature of a piece of music;
   a situation acquisition section for acquiring a situation parameter representing a situation surrounding a user;
   a parameter converting section for converting the situation parameter acquired by the situation acquisition section into the music parameter;
   a music search section for searching through the plurality of music data stored in the music data storage section using the music parameter resulted from the conversion by the parameter converting section, and selecting a piece of music to be reproduced; and
   a reproducing section for reproducing the piece of music selected by the music search section,
   wherein the situation parameter is a movement parameter representing a movement status of a mobile unit moving together with the user, and the music search system is mounted on the mobile unit,
   wherein the movement parameter is a set of location coordinates indicating a location of the mobile unit,
   wherein the music search system comprises:
      a location table storage section for storing a location table in which the set of location coordinates is associated with a location category representing a feature of the location indicated by the set of location coordinates; and
      an impression value table storage section for storing an impression value table in which the location category is associated with an impression value for a piece of music to be reproduced at the location category, and
   wherein the parameter converting section comprises:
      a location category converting section for converting the set of location coordinates acquired by the situation acquisition section into a corresponding location category using the location table; and
      an impression value converting section for converting the corresponding location category resulted from conversion by the location category converting section into a corresponding impression value using the impression value table.

2. The music search system according to claim 1, wherein the music parameter is an impression value obtained by quantifying an impression left on the user by the piece of music.

3. The music search system according to claim 1, further comprising a conversion table storage section for storing a conversion table in which the situation parameter is associated with the music parameter, wherein the parameter converting section converts the situation parameter into the music parameter using the conversion table.

4. The music search system according to claim 3, further comprising:
   a recording accepting section for accepting a recording instruction from the user; and
   an association recording section for adding to the conversion table a set of a music parameter for a piece of music being reproduced and a current situation parameter when the recording accepting section accepts the recording instruction while the reproducing section is reproducing the piece of music.

5. A music search system according to claim 1, further comprising:
   a route generating section for generating a route between two prescribed points;
   a point determination section for determining a prescribed point on the route; and
   a list generating section for generating a list of pieces of music selected by the music search section,
   wherein the situation acquisition section acquires the set of location coordinates at the prescribed point as the situation parameter, and
   wherein the reproducing section reproduces the pieces of music in accordance with the list.

6. The music search system according to claim 1, further comprising:
a mobile terminal; and
a server capable of communicating with the mobile terminal,
wherein the mobile terminal comprises:
the situation acquisition section; and
the reproducing section,
wherein the server comprises:
the music data storage section;
the parameter converting section; and
the music search section,
wherein the situation acquisition section transmits the acquired situation parameter to the server,
wherein the parameter converting section converts the situation parameter transmitted from the situation acquisition section into the music parameter,
wherein the music search section selects a piece of music and transmits data for the selected piece of music to the mobile terminal, and
wherein the reproducing section receives the data for the selected piece of music transmitted from the music search section, and reproduces the selected piece of music.

7. The music search system according to claim 1, further comprising:
a mobile terminal; and
a server capable of communicating with the mobile terminal,
wherein the mobile terminal comprises:
the music data storage section;
the situation acquisition section; and
the reproducing section,
wherein the server comprises:
the parameter converting section;
the music search section; and
a server music data storage section for storing at least information having the same contents as those stored in the music data storage section,
wherein the music data storage section stores music IDs, each identifying a piece of music, so as to be associated with the plurality of pieces of music data,
wherein the situation acquisition section transmits the acquired situation parameter to the server,
wherein the parameter converting section converts the situation parameter transmitted from the situation acquisition section into the music parameter,
wherein the music search section transmits to the mobile terminal a music ID for identifying a selected piece of music, and
wherein the reproducing section reproduces a piece of music indicated by the music ID transmitted from the music search section.

8. A music search system for conducting a music search, comprising:
a music data storage section for storing a plurality of pieces of music data so as to be associated with a corresponding one of music parameters each representing a feature of a piece of music;
a situation acquisition section for acquiring a situation parameter representing a situation surrounding a user;
a parameter converting section for converting the situation parameter acquired by the situation acquisition section into the music parameter;
a music search section for searching through the plurality of music data stored in the music data storage section using the music parameter resulted from the conversion by the parameter converting section, and selecting a piece of music to be reproduced; and
a reproducing section for reproducing the piece of music selected by the music search section,
wherein the situation parameter is a movement parameter representing a movement status of a mobile unit moving together with the user, and the music search system is mounted on the mobile unit,
wherein the movement parameter is a set of location coordinates indicating a location of the mobile unit,
wherein the music search system comprises:
an impression word table storage section for storing an impression word table in which the set of location coordinates is associated with an impression word representing an impression of a piece of music to be reproduced at the location indicated by the set of location coordinates; and
an impression value table storage section for storing an impression value table in which the impression word is associated with the impression value, and
wherein the parameter converting section comprises:
an impression word converting section for converting the set of location coordinates acquired by the situation acquisition section into a corresponding impression word using the impression word table; and
an impression value converting section for converting the corresponding impression word resulted from conversion by the impression word converting section into a corresponding impression value using the impression value table.

9. The music search system according to claim 8, wherein the music parameter is an impression value obtained by quantifying an impression left on the user by the piece of music.

10. The music search system according to claim 8, further comprising a conversion table storage section for storing a conversion table in which the situation parameter is associated with the music parameter, wherein the parameter converting section converts the situation parameter into the music parameter using the conversion table.

11. The music search system according to claim 10, further comprising:
a recording accepting section for accepting a recording instruction from the user; and
an association recording section for adding to the conversion table a set of a music parameter for a piece of music being reproduced and a current situation parameter when the recording accepting section accepts the recording instruction while the reproducing section is reproducing the piece of music.

12. A music search system according to claim 8, further comprising:
a route generating section for generating a route between two prescribed points;
a point determination section for determining a prescribed point on the route; and
a list generating section for generating a list of pieces of music selected by the music search section,
wherein the situation acquisition section acquires the set of location coordinates at the prescribed point as the situation parameter, and
wherein the reproducing section reproduces the pieces of music in accordance with the list.

13. The music search system according to claim 8, further comprising:
a mobile terminal; and
a server capable of communicating with the mobile terminal,
wherein the mobile terminal comprises:
the situation acquisition section; and
the reproducing section,
wherein the server comprises:
the music data storage section;
the parameter converting section; and
the music search section,
wherein the situation acquisition section transmits the acquired situation parameter to the server,
wherein the parameter converting section converts the situation parameter transmitted from the situation acquisition section into the music parameter,
wherein the music search section selects a piece of music and transmits data for the selected piece of music to the mobile terminal, and
wherein the reproducing section receives the data for the selected piece of music transmitted from the music search section, and reproduces the selected piece of music.

14. The music search system according to claim 8, further comprising:
a mobile terminal; and
a server capable of communicating with the mobile terminal,
wherein the mobile terminal comprises:
the music data storage section;
the situation acquisition section; and
the reproducing section,
wherein the server comprises:
the parameter converting section;
the music search section; and
a server music data storage section for storing at least information having the same contents as those stored in the music data storage section,
wherein the music data storage section stores music IDs, each identifying a piece of music, so as to be associated with the plurality of pieces of music data,
wherein the situation acquisition section transmits the acquired situation parameter to the server,
wherein the parameter converting section converts the situation parameter transmitted from the situation acquisition section into the music parameter,
wherein the music search section transmits to the mobile terminal a music ID for identifying a selected piece of music, and
wherein the reproducing section reproduces a piece of music indicated by the music ID transmitted from the music search section.

15. A music search system for conducting a music search, comprising:
a music data storage section for storing a plurality of pieces of music data so as to be associated with a corresponding one of music parameters each representing a feature of a piece of music;
a situation acquisition section for acquiring a situation parameter representing a situation surrounding a user;
a parameter converting section for converting the situation parameter acquired by the situation acquisition section into the music parameter;
a music search section for searching through the plurality of music data stored in the music data storage section using the music parameter resulted from the conversion by the parameter converting section, and selecting a piece of music to be reproduced; and
a reproducing section for reproducing the piece of music selected by the music search section,
wherein the situation parameter is a movement parameter representing a movement status of a mobile unit moving together with the user, and the music search system is mounted on the mobile unit,
wherein the movement parameter is a set of location coordinates indicating a location of the mobile unit,
wherein the music search system comprises:
a location table storage section for storing a location table in which the set of location coordinates is associated with a location category representing a feature of the location indicated by the set of location coordinates;
an impression word table storage section for storing an impression word table in which the location category is associated with an impression word representing an impression of a piece of music to be reproduced at a location indicated by the location category; and
an impression value table storage section for storing an impression value table in which the impression word is associated with the impression value, and
wherein the parameter converting section comprises:
a location category converting section for converting the set of location coordinates acquired by the situation acquisition section into a corresponding location category using the location table;
an impression word converting section for converting the location category resulted from conversion by the location category converting section into a corresponding impression word using the impression word table; and
an impression value converting section for converting the impression word resulted from conversion by the impression word converting section into a corresponding impression value using the impression value table.

16. The music search system according to claim 15, wherein the music parameter is an impression value obtained by quantifying an impression left on the user by the piece of music.

17. The music search system according to claim 15, further comprising a conversion table storage section for storing a conversion table in which the situation parameter is associated with the music parameter, wherein the parameter converting section converts the situation parameter into the music parameter using the conversion table.

18. The music search system according to claim 17, further comprising:
a recording accepting section for accepting a recording instruction from the user; and
an association recording section for adding to the conversion table a set of a music parameter for a piece of music being reproduced and a current situation parameter when the recording accepting section accepts the recording instruction while the reproducing section is reproducing the piece of music.

19. A music search system according to claim 15, further comprising:
a route generating section for generating a route between two prescribed points;
a point determination section for determining a prescribed point on the route; and
a list generating section for generating a list of pieces of music selected by the music search section, wherein the situation acquisition section acquires the set of location coordinates at the prescribed point as the situation parameter, and wherein the reproducing section reproduces the pieces of music in accordance with the list.

20. The music search system according to claim 15, further comprising:

a mobile terminal; and a server capable of communicating with the mobile terminal, wherein the mobile terminal comprises:
the situation acquisition section; and
the reproducing section, wherein the server comprises:
the music data storage section;
the parameter converting section; and
the music search section, wherein the situation acquisition section transmits the acquired situation parameter to the server, wherein the parameter converting section converts the situation parameter transmitted from the situation acquisition section into the music parameter, wherein the music search section selects a piece of music and transmits data for the selected piece of music to the mobile terminal, and wherein the reproducing section receives the data for the selected piece of music transmitted from the music search section, and reproduces the selected piece of music.

21. The music search system according to claim 15, further comprising:

a mobile terminal; and a server capable of communicating with the mobile terminal, wherein the mobile terminal comprises:
the music data storage section;
the situation acquisition section; and
the reproducing section, wherein the server comprises:
the parameter converting section;
the music search section; and
a server music data storage section for storing at least information having the same contents as those stored in the music data storage section, wherein the music data storage section stores music IDs, each identifying a piece of music, so as to be associated with the plurality of pieces of music data, wherein the situation acquisition section transmits the acquired situation parameter to the server, wherein the parameter converting section converts the situation parameter transmitted from the situation acquisition section into the music parameter, wherein the music search section transmits to the mobile terminal a music ID for identifying a selected piece of music, and wherein the reproducing section reproduces a piece of music indicated by the music ID transmitted from the music search section.

22. A music search method for conducting a music search, comprising:

storing a plurality of pieces of music data so as to be associated with a corresponding one of music parameters each representing a feature of a piece of music;

acquiring a situation parameter representing a situation surrounding a user;

converting the acquired situation parameter into the music parameter;

searching through the plurality of stored music data using the music parameter resulted from the conversion, and selecting a piece of music to be reproduced; and reproducing the selected piece of music, wherein the situation parameter is a movement parameter representing a movement status of a mobile unit moving together with the user, wherein the movement parameter is a set of location coordinates indicating a location of the mobile unit, wherein said searching comprises:
storing a location table in which the set of location coordinates is associated with a location category representing a feature of the location indicated by the set of location coordinates; and storing an impression value table in which the location category is associated with an impression value for a piece of music to be reproduced at the location category, and wherein said converting comprises:
converting the set of location coordinates into a corresponding location category using the location table; and converting the corresponding location category into a corresponding impression value using the impression value table.

23. A program for allowing a computer to implement a music search method for conducting a music search, wherein the computer stores a plurality of pieces of music data so as to be associated with a corresponding one of music parameters each representing a feature of a piece of music, and wherein the music search method comprises:
acquiring a situation parameter representing a situation surrounding a user;

converting the acquired situation parameter into the music parameter;

searching through the plurality of stored music data using the music parameter resulted from the conversion, and selecting a piece of music to be reproduced; and reproducing the selected piece of music, wherein the situation parameter is a movement parameter representing a movement status of a mobile unit moving together with the user, wherein the movement parameter is a set of location coordinates indicating a location of the mobile unit, wherein said searching comprises:
storing a location table in which the set of location coordinates is associated with a location category representing a feature of the location indicated by the set of location coordinates; and storing an impression value table in which the location category is associated with an impression value for a piece of music to be reproduced at the location category, and wherein said converting comprises:
converting the set of location coordinates into a corresponding location category using the location table; and converting the corresponding location category into a corresponding impression value using the impression value table.

24. A computer-readable recording medium having a program recorded therein, the program allowing a computer to implement a music search method for conducting a music search, wherein the computer stores a plurality of pieces of music data so as to be associated with a corresponding one of music parameters each representing a feature of a piece of music, and wherein the music search method comprises:
- acquiring a situation parameter representing a situation surrounding a user;
- converting the acquired situation parameter into the music parameter;
- searching through the plurality of stored music data using the music parameter resulted from the conversion, and selecting a piece of music to be reproduced; and
- reproducing the selected piece of music selected at the music search steps wherein the situation parameter is a movement parameter representing a movement status of a mobile unit moving together with the user, wherein the movement parameter is a set of location coordinates indicating a location of the mobile unit, wherein said searching comprises:
- storing a location table in which the set of location coordinates is associated with a location category representing a feature of the location indicated by the set of location coordinates; and
- storing an impression value table in which the location category is associated with an impression value for a piece of music to be reproduced at the location category, and wherein said converting comprises:
- converting the set of location coordinates into a corresponding location category using the location table; and
- converting the corresponding location category into a corresponding impression value using the impression value table.

* * * * *

UNITED STATES PATENT AND TRADEMARK OFFICE
CERTIFICATE OF CORRECTION

PATENT NO. : 7,227,071 B2 Page 1 of 1
APPLICATION NO. : 10/609545
DATED : June 5, 2007
INVENTOR(S) : Junichi Tagawa et al.

It is certified that error appears in the above-identified patent and that said Letters Patent is hereby corrected as shown below:

In the Claims
In column 33, claim 24, line 15, please change "search steps" to --search step,--.

Signed and Sealed this

Sixteenth Day of October, 2007

JON W. DUDAS
*Director of the United States Patent and Trademark Office*